(12) United States Patent
Wehrman et al.

(10) Patent No.: US 11,453,950 B1
(45) Date of Patent: Sep. 27, 2022

(54) METHOD AND APPARATUS FOR DOSING HYDROGEN IN A CENTRIFUGAL COMPRESSION SYSTEM

(71) Applicant: Air Products and Chemicals, Inc., Allentown, PA (US)

(72) Inventors: Joseph Gerard Wehrman, Macungie, PA (US); Paul Higginbotham, Surrey (GB); Vincent White, Surrey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 17/201,337

(22) Filed: Mar. 15, 2021

(51) Int. Cl.
| | |
|---|---|
| C25B 1/04 | (2021.01) |
| C25B 1/50 | (2021.01) |
| C25B 9/70 | (2021.01) |
| C25B 15/08 | (2006.01) |

(52) U.S. Cl.
CPC ............ C25B 1/04 (2013.01); C25B 1/50 (2021.01); C25B 9/70 (2021.01); C25B 15/08 (2013.01); C25B 15/081 (2021.01)

(58) Field of Classification Search
CPC .......... C25B 15/08; C25B 15/081; C25B 1/04
See application file for complete search history.

(56) References Cited

U.S. PATENT DOCUMENTS

| | | | |
|---|---|---|---|
| 3,401,111 A | 9/1968 | Jackson | |
| 3,801,708 A | 4/1974 | Smith et al. | |
| 3,992,167 A | 11/1976 | Beddome | |
| 6,811,762 B2 * | 11/2004 | Moore | C01C 1/0405 422/148 |
| 9,441,542 B2 | 9/2016 | Zhang et al. | |
| 9,663,381 B2 * | 5/2017 | Alkusayer | B01J 19/24 |
| 2010/0076097 A1 * | 3/2010 | Metz | F01K 13/00 422/186 |

FOREIGN PATENT DOCUMENTS

JP 2075882 3/1990

OTHER PUBLICATIONS

Haoyu Yin, et al, "Performance analysis of the water-injected centrifugal vapor compressor", Elsevier, Energy 200, 2020, 1-16.

* cited by examiner

*Primary Examiner* — Brian W Cohen
(74) *Attorney, Agent, or Firm* — Matthew R. Weaver

(57) ABSTRACT

A method for supplying hydrogen gas for consumption in at least one downstream process, the method comprising: electrolysing water to provide hydrogen gas; compressing the hydrogen gas in a multistage compression system to provide compressed hydrogen gas; and feeding at least a portion of the compressed hydrogen gas to the downstream process(es); wherein the multistage compression system comprises at least one centrifugal compression stage; wherein the hydrogen gas is dosed with nitrogen gas upstream of the centrifugal compression stage(s); and wherein the nitrogen gas is present in the compressed hydrogen gas when fed to the downstream process(es).

11 Claims, 6 Drawing Sheets

METHOD AND APPARATUS FOR DOSING HYDROGEN IN A CENTRIFUGAL COMPRESSION SYSTEM

TECHNICAL FIELD

The present invention relates to the supply of hydrogen gas for consumption in at least one downstream process. The present invention is particularly concerned with ways to minimise the impact of reduced apparent molecular weight on the discharge pressure in a centrifugal compression stage of multistage compression system.

BACKGROUND

Positive-displacement compressors, such as reciprocating compressors, are typically used in industrial processes to compress hydrogen gas. This type of compressor works by confining successive volumes of gas within a closed space, such as by using a piston driven by a crankshaft to deliver gases at high pressure.

The performance of positive-displacement compressors, such as reciprocating compressors, is typically uniform for gaseous media of both a very low molecular weight and a high molecular weight. This type of compressor is therefore suitable for a range of gases and are particularly suitable for the compression of hydrogen gas. However, these types of compressors are not preferred for handling large volumes of gas. In order to do so, a large number of compressors must be used in parallel due to the structure of these types of compressors. This results in considerable capital expense and operating costs.

In contrast, centrifugal compressors are a type of dynamic compressor, in which gas is compressed by mechanical action of rotating vanes or impellers imparting velocity to the gas. Gas typically enters at the centre of the impellers and is propelled out to the radial edges under rotary motion to deliver gases at high velocity which impact the casing. The velocity of the gas is converted to a static pressure to deliver high pressure gases. These types of compressors are typically more suited to handling large volumes of gases at lower costs.

However, these compressors are typically not suitable for compressing low molecular weight gases, such as hydrogen. This is because it is more difficult to establish sufficient centrifugal force due to the lower density of the gas, making high-pressure compression more difficult.

Therefore, for centrifugal compression, the pressure ratio (the discharge pressure divided by the inlet pressure, for a particular stage of compression) is highly sensitive to, and dependent on, the molecular weight of the gas being compressed. That is, centrifugal compression of a gas with a low molecular weight may result in a discharge pressure at the outlet which is lower than the specified pressure, unless additional impellers are used.

Typically, in order to compress a low molecular weight gas in a centrifugal compression system, such a system must be designed with many more impellers in series to accommodate the reduced gas density. This design substantially increases the cost of the compression system and is undesirable due to the inherent mechanical constraints of such a system.

There is therefore a desire in the art to provide a solution which will allow current centrifugal compression systems to maintain pressure ratios in an efficient way when used with low molecular weight gases, without dramatically increasing costs.

At present, the inventors are not aware of any prior art which addresses this issue in the context of compressing wet hydrogen gas in centrifugal compressors for downstream processes that consume nitrogen.

SUMMARY

According to a first aspect of the present invention, there is provided a method for supplying hydrogen gas for consumption in at least one downstream process, the method comprising:
  electrolysing water to provide hydrogen gas;
  compressing the hydrogen gas in a multistage compression system to provide compressed hydrogen gas; and
  feeding at least a portion of the compressed hydrogen gas to the downstream process(es);
wherein the multistage compression system comprises at least one centrifugal compression stage;
wherein the hydrogen gas is dosed with nitrogen gas upstream of the centrifugal compression stage(s); and
wherein the nitrogen gas is present in the compressed hydrogen gas when fed to the downstream process(es).

According to a second aspect of the present invention, there is provided a method of using a centrifugal compressor for compressing hydrogen gas, the method comprising dosing hydrogen gas with nitrogen gas upstream of the centrifugal compressor to provide a nitrogen-blended hydrogen gas and compressing the nitrogen-blended hydrogen gas in the centrifugal compressor.

According to a third aspect of the present invention, there is provided an apparatus for supplying hydrogen gas for consumption in at least one downstream process, the apparatus comprising:
  a plurality of electrolysers arranged in parallel for electrolysing water to provide hydrogen gas;
  an electricity generation system for generating electricity to power the plurality of electrolysers, the electricity generation system being in electrically conductive communication with the plurality of electrolysers;
  a multistage compression system for compressing the hydrogen gas to provide a compressed hydrogen gas, the multistage compression system comprising a feed end, an outlet end and at least one centrifugal compression stage, the feed end being in fluid flow communication with the plurality of electrolysers;
  a nitrogen gas source for supplying nitrogen gas, wherein the source is arranged to dose the hydrogen gas with nitrogen gas upstream of the centrifugal compression stage(s) in the multistage compression system; and
  at least one downstream processing unit arranged to receive at least a portion of the compressed hydrogen gas dosed with nitrogen gas, the downstream processing unit(s) being in fluid flow communication with the outlet end of the multistage compression system.

DETAILED DESCRIPTION

According to a first aspect of the present invention, there is provided a method for supplying hydrogen gas for consumption in at least one downstream process.

The method of the present invention includes dosing hydrogen gas with nitrogen gas to increase the apparent molecular weight of the hydrogen gas.

The term "dosing" in the context of the present invention is intended to mean that the nitrogen gas is fed to the hydrogen gas in small amounts to provide a nitrogen-blended hydrogen gas wherein the majority of the blended gas is hydrogen gas.

The term "hydrogen gas" may be used to refer to hydrogen gas before and/or after it has been dosed with nitrogen gas. The terms "blended hydrogen gas" or "nitrogen-blended hydrogen gas" specifically refer to hydrogen gas after it has been dosed with nitrogen gas. Whereas the term "unblended hydrogen gas" refers to specifically to hydrogen gas that has not yet been dosed with nitrogen gas.

The term "apparent molecular weight" in the context of the present invention is intended to mean the molecular weight of a gaseous medium having an admixture of low and high molecular weight constituents. The apparent molecular weight of a gas mixture can be measured, or alternatively can be estimated by calculating the sum of the products of the mole fractions of each component times the molecular weight of that component, i.e.

$$M_{app} = \Sigma(M_A \times y_A + M_B \times y_B + \ldots)$$

for a mixture of gases A+B+ . . . , where $M_X$ is the molecular weight of a component gas X, and $y_X$ is the mole fraction of the component gas X.

The term "suitable" in the context of pressure reduction is intended to mean that the pressure of the nitrogen gas (or nitrogen-blended hydrogen gas) is reduced to an appropriate extent having regard to the inlet pressure of the stage of the multistage compression system to which the reduced pressure nitrogen gas (or nitrogen-blended hydrogen gas) is fed.

In the following discussion of embodiments of the present invention, the pressures given are absolute pressures unless otherwise stated.

Electrolysis

A method according to the present invention comprises producing hydrogen gas by electrolysis of water to provide a hydrogen gas. Any suitable form of water electrolysis may be used including alkaline water electrolysis and polymer electrolyte membrane (PEM) water electrolysis.

The water used for the electrolysis may be sea water that has been desalinated, possibly by reverse osmosis, and demineralised.

The electricity required for the electrolysis may be generated from one or more suitable energy sources, including but not limited to, renewable energy sources, onsite petrol-, diesel- or hydrogen-powered generator(s), fuel cells, or taken from a local or national grid, or combinations of these sources.

Preferably, at least some of the electricity required for the electrolysis may be generated from a renewable energy source including wind energy, solar energy, tidal energy and hydroelectric energy, or combinations of these sources, particularly wind energy and solar energy. The electricity generated from these sources is used to provide power to the electrolysers.

Preferably, the process will be self-contained in terms of power generation for the electrolysis. Thus, preferably the entire electricity demand for the electrolysis is met using renewable power sources.

It is envisaged, however, that electricity generated from one or more renewable energy sources may be supplemented by other sources either during periods of particularly high demand for product(s) from the downstream process(es) and/or during periods when the renewable power source is only available below the threshold required to meet demand, or is not available at all. In these cases, additional electricity may be taken from onsite battery storage and/or generated from one or more onsite petrol-, diesel- or hydrogen-powered generator(s), including fuel cells and/or taken from a local or national grid.

The electrolysis can be carried out at any suitable scale. In some embodiments, however, the electrolysis may have a total capacity of at least 1 gigawatt (GW). The maximum total capacity of the electrolysis is limited only by practical considerations, e.g. generating sufficient power from renewable energy sources to power the plurality of electrolysers. Thus, the electrolysis may have a maximum total capacity of about 10 GW or more. The total capacity of the electrolysis may be from 1 GW to about 5 GW, e.g. from about 1.5 GW to about 3 GW.

The hydrogen gas is typically generated by the electrolysis at pressure slightly higher than atmospheric pressure, e.g. about 1.3 bar. However, in some embodiments, the electrolysis produces hydrogen at a somewhat higher pressure, for example up to about 3 bar.

Thus, hydrogen gas is usually fed to the multistage compression system at a pressure in the range from atmospheric pressure to about 3 bar, preferably in the range from atmospheric pressure to about 1.5 bar, e.g. about 1.1 bar.

Purification

It will be appreciated that hydrogen gas produced from electrolysis of water will contain impurities. Therefore, the term "hydrogen gas" when used in the context of the present invention is intended to refer to hydrogen gas with such impurities, unless and until the hydrogen gas is purified.

In particular, this term includes hydrogen gas produced by electrolysis which is typically saturated with water at 40° C. and usually contains some residual oxygen gas, typically about 500 to about 1000 ppm(v). These impurities will usually have to be removed, depending on the tolerances of the downstream process(es).

In this regard, oxygen is a poison for conventional catalysts used in the Haber process. Thus, in embodiments in which the downstream process is ammonia synthesis, the feed to the catalyst will contain less than about 10 ppm, typically less than about 5 ppm, total oxygen, i.e. oxygen atoms from any impurity source such as oxygen gas ($O_2$), water ($H_2O$), carbon monoxide (CO) and/or carbon dioxide ($CO_2$). Accordingly, the feed will also be dry, i.e. no more than 1 ppm water.

Downstream processes using conventional "grey" hydrogen (i.e. hydrogen derived from a hydrocarbon or carbonaceous feed stream without capture of carbon dioxide, e.g. by reforming natural gas), or "blue" hydrogen (i.e. hydrogen derived in the same way as "grey" hydrogen but where some or all of the carbon dioxide associated with production is captured), such as refineries, have similar tolerances for oxygen and water.

The compressed hydrogen gas is preferably purified upstream of being fed to the downstream process.

In this regard, the residual oxygen gas in the compressed hydrogen gas may be converted into water by catalytic combustion of some of the hydrogen to produce oxygen-depleted compressed hydrogen gas (containing no more than 1 ppm $O_2$) which may then be dried to produce dry compressed hydrogen gas (containing no more than 1 ppm water) for use in the downstream process(es).

In the context of the present invention, the purification method does not remove any, or at least any substantial quantities of, nitrogen from the hydrogen gas.

Compression

A method according to the present invention comprises a step of compressing the hydrogen gas in a multistage compression system to provide a compressed hydrogen gas.

The multistage compression system is responsible for compressing hydrogen gas from the pressure at which the hydrogen gas is generated by electrolysis to an elevated pressure that is generally at least little higher than the feed pressure of the downstream process.

As explained in more detail below, at some point before or during the multiple stages of compression the hydrogen gas will be dosed with nitrogen. Therefore, in this section "hydrogen gas" may refer to either unblended hydrogen gas or nitrogen-blended hydrogen gas, depending on which stage the hydrogen gas is dosed upstream of within the multistage compression system.

As will be readily appreciated, a "multistage" compression system has a plurality of stages of compression that may be split between compressors in parallel and/or in series. The overall pressure ratio across each stage is generally in the range of about 1.5 to about 2.5, e.g. about 2 to about 2.5, in order to limit the increase in temperature of the compressed gas.

Coolers are typically required between adjacent stages ("inter-coolers") and typically required after a final stage ("after-coolers") in multistage compression systems to remove heat of compression from the compressed gas. Thus, in the context of the present invention, a "stage" of compression refers to the part of the compression system between coolers.

The multistage compression system comprises one or more compression sections. A "section" of compression in this context refers to the part of the compression system between feeds and products. Each section may comprise one or more stages of compression, together with the associated coolers.

In the present invention, the multistage compression system comprises at least one centrifugal compression stage. That is, the compressors used in one, some, or all stages are centrifugal compressors. The multistage compression system may comprise a plurality of centrifugal compressors. Preferably, at least the first or initial stage of compression in the multistage compression system comprises a centrifugal compressor.

It will be appreciated that in some embodiments the multistage compression system may have at least one centrifugal compression stage in combination with at least one reciprocal compression stage, i.e. a stage comprising reciprocating compressor(s).

It will be envisaged that in some preferred embodiments, all stages of the multistage compression system are centrifugal compression stages.

The compressed hydrogen gas leaving the outlet end of the multistage compression system will have been dosed with nitrogen gas (at some point upstream of a centrifugal compression stage) and hence contains nitrogen gas.

The compressed nitrogen-blended hydrogen gas produced by the multistage compression system typically has a pressure from about 10 bar to about 50 bar. In some embodiments, the pressure of the compressed nitrogen-blended hydrogen gas is from about 25 bar to about 35 bar, preferably about 30 bar. In other embodiments, the pressure of the compressed nitrogen-blended hydrogen gas is from about 10 bar to about 12 bar, preferably about 11 bar.

In some embodiments, the multistage compression system has only a single section to compress the hydrogen gas to the desired elevated pressure. In other embodiments, the multistage compression system comprises a first section and at least one further section downstream of the first section.

In particular embodiments, the multistage compression system has two sections, a first (low pressure or "LP") section in which hydrogen gas is compressed from the feed pressure to the multistage compression system to a first elevated pressure in the range from about 2 bar to about 6 bar, and a second (medium pressure or "MP") section in which hydrogen gas is compressed from the first elevated pressure to the final elevated pressure desired for the downstream process(es).

In some embodiments, the first elevated pressure of the hydrogen gas after compression in the first section may be in the range of about 2 bar to about 3 bar, e.g. 2.5 bar. In other embodiments, the first elevated pressure may be in the range of about 4 bar to about 6 bar, e.g. 5 bar.

Downstream Process(es)

The compressed hydrogen gas is consumed in a downstream process, or in more than one downstream process arranged in parallel.

The downstream process(es) could include any process that would currently use "grey" hydrogen or "blue" hydrogen. Such processes include oil refining and steel manufacture.

In the present invention, the downstream process(es) consumes hydrogen. In some preferred embodiments, at least some, e.g. all, of the compressed nitrogen-blended hydrogen is used in a downstream process(es) that consumes nitrogen gas, or wherein nitrogen gas is a reactant.

More preferably, at least some, e.g. all, of the compressed hydrogen is used to produce ammonia via the Haber (or Haber-Bosch) process. In this process, ammonia is produced by reacting a mixture of hydrogen and nitrogen gases over an iron-based catalyst at high temperature, typically at about 400° C. to about 500° C., and at high pressure, typically at a pressure in the range from about 100 bar to 200 bar.

Dosing of Hydrogen Gas with Nitrogen Gas

To improve the performance of a centrifugal compression stage in which hydrogen gas is to be compressed, the present invention involves dosing the hydrogen gas with nitrogen to increase the apparent molecular weight of the gas feed entering the centrifugal compression stage.

Pure hydrogen gas has a molecular weight of 2.016. However, as mentioned above, wet hydrogen gas generated by electrolysis of water will typically be saturated with water which has a molecular weight of 18.015, which is significantly higher than that of hydrogen gas. Therefore, "wet" hydrogen gas has a higher "apparent" molecular weight than pure hydrogen gas, typically around 3 but necessarily somewhere between the molecular weight of pure hydrogen and pure water, 2.016 and 18.015 respectively, depending on the water content. Thus, in some embodiments, the hydrogen gas generated by electrolysis of water will have an apparent molecular weight of from about 2.5 to about 4, or from about 2.5 to about 3.5.

When water-saturated hydrogen gas passes through the inter-coolers and after-coolers of a multistage compression system, water is removed from the hydrogen gas via condensation of the gaseous water and phase separation of liquid water. This removal of water from the hydrogen gas in turn causes the apparent molecular weight of the hydrogen gas to decrease as the heavier water molecules are extracted and the hydrogen gas is dried. As water is removed, the apparent molecular weight of the hydrogen gas approaches about 2.

As mentioned above, in centrifugal compressors the pressure ratio (the discharge pressure divided by the inlet pressure for a stage of compression) is highly sensitive to, and dependent on, the molecular weight of the gas being compressed.

This change in apparent molecular weight due to the drying of wet hydrogen gas between stages in a multistage compression system is detrimental to the performance of the centrifugal compressors at each subsequent stage, resulting in discharge pressures below the specified pressure.

Table 1 below demonstrates this effect. In particular, it can be seen that the amount of water removed between stages, and thus the reduction in apparent molecular weight, results in a reduction of the pressure ratio upon recycle.

For example, hydrogen gas is compressed in stage 1 to the specified discharge pressure of 2.5 bar. Between stages the gas loses water (0.067 to 0.030 water mole fraction), and so has a reduced apparent molecular weight (3.089 to 2.488 mol. wt.). This gas is then recycled back through stage 1 with these characteristics and the discharge pressure for stage 1 for the recycled gas is 2.167 bar, much lower than the specified pressure.

TABLE 1

| Centrifugal Hydrogen compression | | | | | |
| --- | --- | --- | --- | --- | --- |
| Stage no. | 1 | 2 | 3 | 4 | 4 |
| Normal feed, 30 bar discharge pressure | | | | | |
| Location | Inlet | Inlet | Inlet | Inlet | Outlet |
| Stage pressure (bar) | 1.1 | 2.5 | 6 | 13.6 | 30 |
| Stage relative humidity | 100% | 100% | 100% | 100% | 100% |
| Stage temp (° C.) | 40 | 40 | 40 | 40 | 40 |
| Water mole fraction | 0.067 | 0.030 | 0.012 | 0.005 | 0.002 |
| Apparent molecular weight | 3.089 | 2.488 | 2.213 | 2.103 | 2.055 |
| Full recycle | | | | | |
| Stage inlet relative humidity | 44% | 42% | 44% | 45% | — |
| Stage inlet temp (° C.) | 40 | 40 | 40 | 40 | — |
| Water mole fraction | 0.030 | 0.012 | 0.005 | 0.002 | — |
| Apparent molecular weight | 2.488 | 2.213 | 2.103 | 2.005 | — |
| Head ratio | 0.806 | 0.889 | 0.950 | 0.977 | — |
| Ratio of pressure ratios (full recycle vs full flow) | 0.867 | 0.918 | 0.965 | 0.984 | — |
| Discharge pressure on recycle with same inlet pressure | 2.167 | 5.510 | 13.122 | 29.532 | — |
| Speed change needed to maintain pressure ratio | 1.114 | 1.060 | 1.026 | 1.011 | — |

In the present invention, this problem is addressed by dosing the hydrogen gas with a typically small amount of nitrogen gas before or during compression of the gas. In particular, the method of the present invention involves dosing the hydrogen gas with nitrogen gas upstream of at least one centrifugal compression stage of the multistage compression system, thereby providing a nitrogen-blended hydrogen gas.

The hydrogen gas is dosed with nitrogen gas upstream of any centrifugal compression stage of the multistage compression system. However, it is particularly preferred that the hydrogen gas is dosed with nitrogen gas upstream of, or prior to, the initial stage of the multistage compression system which is a centrifugal compression stage—i.e. before any compression of the hydrogen gas has taken place.

If the method comprises dosing the hydrogen gas with nitrogen gas at an inter-stage of the multistage compression system, the method also comprises compressing (or reducing the pressure of, as the case may be) the nitrogen gas to substantially the same pressure as the hydrogen gas stream to which it is going to be fed, or substantially the same pressure as the inlet pressure of the inter-stage of the multistage compression system.

By dosing the hydrogen gas with nitrogen upstream of at least one stage of the multistage compression system and thus increasing the nitrogen gas content of the hydrogen gas, the apparent molecular weight of the gas being compressed is increased. This enables the centrifugal compressor in that stage to generate enough centrifugal force to provide the specified pressure ratio (the discharge pressure divided by the inlet pressure for a stage of compression). In turn, this allows hydrogen gas to be compressed in smaller, more cost-effective centrifugal compression systems with fewer stages.

Once the nitrogen-blended hydrogen gas undergoes compression and is passed through the inter-coolers and aftercoolers, the apparent molecular weight of the nitrogen-blended hydrogen gas is reduced only in so far as the water is removed. This means that even if the water content changes, and the apparent molecular weight is reduced, the apparent molecular weight is still a level at which the centrifugal compressors operate more effectively. This will be the case even if all of the water is removed to provide completely "dry" hydrogen—for example, after a purification method.

The result is that the apparent molecular weight therefore will not drop to a level at which the performance of the centrifugal compressor is negatively impacted. This removes the need to resort to conventional methods of mitigating drops in pressure ratio. For example, conventional methods of increasing pressure ratio typically include increasing the impeller speed during operation, which requires increased power and is limited by the maximum speeds of the impellers. Alternatively, another method is designing the multistage compression system with many more stages. None of these methods are required once the present invention has been implemented.

The amount of nitrogen that is fed to the hydrogen gas to dose it may be selected based on the amount of water present in the hydrogen gas generated from electrolysis. Where the level of water saturation is low, the amount of nitrogen added may be higher to compensate and vice versa, for example.

It may also depend on at which point the nitrogen gas is being fed to the hydrogen gas. This is because the hydrogen gas may be less saturated with water before being fed to an intermediate stage of compression when compared with the hydrogen gas before being fed to an initial stage of compression in the multistage compression system.

In some embodiments, after dosing, the nitrogen-blended hydrogen gas has up to about 24 mol %, or up to about 20 mol %, or up to about 15 mol %, or up to about 10 mol %, or up to about 5 mol % of nitrogen gas.

In some embodiments, after dosing, the nitrogen-blended hydrogen gas has at least about 0.05 mol %, or at least about 0.1 mol %, or at least about 0.5 mol %, or at least about 1 mol %, e.g. at least about 2 mol % of nitrogen gas.

In some embodiments, after dosing, the nitrogen-blended hydrogen gas has from about 0.5 mol % to about 10 mol %, e.g. from about 1 to about 5 mol %, or from about 2 to about 4 mol %, preferably about 3 mol %, of nitrogen gas.

Alternatively, it is possible to define the amount of nitrogen to be added based on the desired apparent molecular weight, as this can be measured. In some embodiments, the hydrogen gas is dosed with an amount of nitrogen gas such that the apparent molecular weight (in g/mol) of the resultant nitrogen-blended hydrogen gas is from about 2.05 to about 7, e.g. from about 2.1 to about 5, or from about 2.5 to about 4, or preferably from about 2.5 to about 3.5.

In some embodiments, the hydrogen gas is dosed with an amount of nitrogen gas such that the apparent molecular weight of the nitrogen-blended hydrogen gas is greater than the apparent molecular weight of the unblended hydrogen gas (i.e. hydrogen gas obtained from electrolysis of water or from a storage system) by an amount in a range from about 0.1 to about 3.0, e.g. from about 0.5 to about 2.0, or preferably by about 0.7 to about 1.5.

The method may comprise dosing the hydrogen gas with nitrogen gas upstream of any centrifugal compression stage in the multistage compression system, to target particular stages of compression which suffer from poor performance, such as stages where a certain amount of water has been removed, for example. Here "upstream of" a stage means the gas is fed into a gas stream before it is fed into the inlet of the stage, i.e. just before it is compressed. The hydrogen gas is dosed with nitrogen gas upstream of a stage in the multistage compression system so that the particular stage in question undergoes better performance as a result of the high apparent molecular weight of the nitrogen-blended hydrogen gas.

In some embodiments, the method comprises dosing the hydrogen gas with nitrogen gas upstream of an intermediate stage of the multistage compression system. However, in preferred embodiments the method comprises dosing the hydrogen gas with nitrogen gas upstream of an initial stage of the multistage compression system which is a centrifugal compression stage—i.e. before any compression of the hydrogen gas has taken place. This is because the increased apparent molecular weight of the hydrogen gas will improve the performance in the centrifugal compressors for all of the subsequent stages of the multistage compression system.

As mentioned above, in some embodiments the multistage compression system may comprise a first section and at least one further section downstream of the first section. In these embodiments, the method may comprise dosing the hydrogen gas with nitrogen gas at an initial stage of the first section of the multistage compression system. In other embodiments, the method may comprise dosing the hydrogen gas with nitrogen gas at an initial stage of the at least one further section of the multistage compression system.

In preferred embodiments, the downstream process(es) of the present invention consumes nitrogen gas. More preferably, the downstream process(es) includes ammonia synthesis. Thus, the method may comprise feeding additional nitrogen gas to the compressed nitrogen-blended hydrogen gas feed in preparation for consumption in the downstream process(es). The amount of the additional nitrogen gas to be added may be based on the amount of nitrogen gas to be consumed in the downstream process. The amount of additional nitrogen gas may also be based on the amount of nitrogen gas already present in the compressed hydrogen gas.

Preferably, the method comprises compressing the additional nitrogen gas prior to feeding it to the compressed nitrogen-blended hydrogen gas, so that it is at a pressure suitable for feeding to the downstream process.

In such embodiments, the method involves feeding additional nitrogen gas to the compressed nitrogen-blended hydrogen gas, to give a mixture of synthesis gases (or "syngas"), in preparation for consumption in the downstream process(es). For example, if the downstream process is ammonia synthesis, the additional nitrogen will be fed to the nitrogen-blended hydrogen gas such that the ammonia synthesis gas has molar quantities of about 25 mol % of nitrogen gas and about 75 mol % of hydrogen gas.

Thus, for example, the additional nitrogen gas need only be added in an amount that "tops up" the level of nitrogen gas to the required amount in preparation for consumption in the downstream process(es).

Thus, in some embodiments, nitrogen gas may be added at two separate stages in the overall method. First, the hydrogen gas is dosed with nitrogen gas upstream of a centrifugal compression stage in the multistage compression system. Secondly, further nitrogen gas is then fed to the compressed hydrogen gas in preparation for consumption in the downstream process.

Thus, a particular advantage of the present invention is that this process does not require the removal of nitrogen gas upstream of the downstream process. That is, nitrogen gas which is fed to the hydrogen gas for dosing does not need to be removed later, as it is consumed in the downstream process.

Accordingly, an additional advantage of this process is that no expensive additional equipment for gas separation or extraction is required for removing the nitrogen gas. Moreover, in embodiments where the downstream process consumes nitrogen gas and therefore already involves a nitrogen gas source and feed line, all that is required to implement the present invention is an additional feed line (and possibly a valve) which doses the hydrogen gas with nitrogen gas upstream of a centrifugal compression stage.

In embodiments where a hydrogen storage system is used, a particular advantage of adding low amounts of nitrogen gas upstream of a stage of compression, rather than introducing 25 mol % or more, is that the volume of storage required for the storage system is not dramatically increased. For instance, adding 25 mol % of nitrogen would increase the storage requirements by about 33% of volume.

In addition, nitrogen gas is produced more efficiently at an elevated pressure, and therefore by adding most of the nitrogen gas for the downstream process after compression but upstream of the downstream process this provides a more efficient overall process.

In some embodiments, the amount of hydrogen gas being generated by electrolysis of water may be variable. This may be inherent in systems where some of the electricity generated for the electrolysis is from a renewable power or energy source, such as solar or wind energy, for example.

In embodiments where the amount of hydrogen gas being generated by electrolysis of water is variable, the amount of nitrogen gas which is fed to the hydrogen gas is determined based upon the amount of hydrogen gas produced by the electrolysis.

For example, the amount of nitrogen gas being fed to the hydrogen gas may be a fixed amount relative to the amount of hydrogen gas. That is, as the amount of hydrogen gas decreases (due to lack of renewable power) the amount of nitrogen gas being fed to the hydrogen gas is decreased by the same amount. This advantageously enables the concentration of the nitrogen in the hydrogen gas to remain constant.

In some embodiments, the above method of controlling the flow and/or pressure of the nitrogen gas may be implemented by a suitable control system, the control system being configured to monitor the amount of the hydrogen gas generated by the electrolysis by measurement. The measurement may be made by direct flow measurements, or alternatively may be inferred through measurements of the electrolyser current, for example.

In some embodiments, the method may further comprise a feedback loop, which takes into account information about the concentration of nitrogen gas in the nitrogen-blended hydrogen gas. This may be determined by measurement of the gas composition, such as by using a mass spectrometer or density meter, for example.

By determining the amount of nitrogen gas to be added based on the amount of hydrogen gas, this enables the concentration of the nitrogen to be carefully controlled. For example, it advantageously allows the nitrogen concentration to be kept constant despite variations in the amount of hydrogen gas.

In embodiments where the flowrate of hydrogen gas from the electrolysers is variable and a hydrogen storage system is used, it is disadvantageous to add all of the nitrogen gas that is required for the downstream process (i.e. 25 mol % for ammonia synthesis) to the hydrogen gas upstream of a stage of compression. This is because the flowrate from the nitrogen gas source would also need to be variable across a large range. This, in turn, would require an air separation unit (ASU) of high capacity in order to cope.

For example, if the electrolyser flowrate were to vary between 0 and 130% of the ammonia plant demand and the nitrogen gas source supplied all of the nitrogen gas for the downstream process upstream of a stage of compression, the nitrogen gas source would need to vary its flowrate accordingly, sometimes requiring a shut-down or venting of nitrogen gas when the electrolyser flow is at 0% (and where nitrogen-blended hydrogen gas is instead being supplied from storage).

In contrast, by dosing the hydrogen gas with a low amount of nitrogen gas, and then adding additional nitrogen gas later, this results in a flowrate variation of the nitrogen source relative to the capacity of the nitrogen gas source e.g. an ASU) that is much smaller. For example, adding 3 mol % of nitrogen gas to the hydrogen gas only requires a variation in the flowrate of a nitrogen source (e.g. an ASU) of around 4%. Advantageously, this means the nitrogen source does not require shutting-down when the electrolyser flow reaches 0% (and hydrogen gas is being supplied from storage).

Hydrogen Gas Storage

Depending on the type of electricity generated for the electrolysis, the present invention may include the use of hydrogen storage in the method.

European Patent Application No. 20188259.4 in the same name as the present Applicant describes a method of storing hydrogen gas for use in a multistage compression system and this document is incorporated herein by reference in its entirety.

In some embodiments where the electricity generated for the electrolysis may be from a renewable energy source, the availability of the energy source will inherently fluctuate. This results in less hydrogen gas being produced by the electrolysis. One way in which this problem may be addressed is by providing a system for collecting and storing at least some, preferably all, of the excess nitrogen-blended hydrogen gas produced during periods when production exceeds demand from the downstream process(es), and distributing stored nitrogen-blended hydrogen gas to the downstream process(es) during periods when the demand exceeds production.

In some embodiments, the compressed nitrogen-blended hydrogen may be stored without further compression. In these embodiments, the gas is stored at a pressure up to a maximum pressure of the pressure to which the nitrogen-blended hydrogen is compressed in the multistage compression system, e.g. a pressure up to a maximum of about the feed pressure of the downstream process (where there is only one) or about the feed of one of the downstream processes (if there are more than one). In such embodiments, the compressed nitrogen-blended hydrogen may perhaps be stored at a pressure up to a maximum pressure in the region of about 25 bar to about 30 bar.

The compressed nitrogen-blended hydrogen may however be further compressed prior to storage. In these embodiments, compressed nitrogen-blended hydrogen gas may be stored at a pressure up to a maximum of about 200 bar, or up to a maximum of about 150 bar, or up to a maximum of about 100 bar, or up to a maximum of about 90 bar, or up to a maximum of about 80 bar, or up to a maximum of about 70 bar, or up to a maximum of about 60 bar, or up to a maximum of about 50 bar.

During periods when the level of demand for hydrogen exceeds the production level, compressed nitrogen-blended hydrogen gas is removed from storage and reduced in pressure to produce reduced pressure nitrogen-blended hydrogen gas (hereinafter referred to as simply "reduced pressure hydrogen gas" for simplicity). Pressure may be reduced in any conventional manner, particularly by passing the gas through a valve.

The pressure of the reduced pressure hydrogen gas will depend on the pressure at the point in the multistage compression system to which the reduced pressure hydrogen gas is to be added.

In some embodiments, reduced pressure hydrogen gas may be fed to the final stage of the multistage compression system. In these embodiments, the reduced pressure hydrogen gas will be at the inlet pressure of the feed to the final stage.

In other embodiments, reduced pressure hydrogen gas may be fed to an intermediate stage of the multistage compression system. In these embodiments, the reduced pressure hydrogen gas will be at the inlet pressure of the feed to the intermediate stage.

The intermediate stage may be an intermediate stage within a compression section or, where there are two or more sections in the multistage compression system, the initial stage within a further compression section downstream of a first compression section. In these embodiments, the reduced pressure hydrogen gas will be at the inlet pressure of the feed to the further compression section, i.e. the "inter-section" pressure.

In still further embodiments, the reduced pressure hydrogen gas may be fed to the feed end, i.e. to the initial stage, of the multistage compression system. In these embodiments, the reduced pressure hydrogen gas will be the feed pressure to the multistage compression system, e.g. about 1.1 bar.

During periods when demand exceeds production, the method may comprise:
- reducing the pressure of the compressed hydrogen gas withdrawn from storage to produce reduced pressure hydrogen gas at the inlet pressure to a first stage of the multistage compression system (a first intermediate pressure); and
- feeding the reduced pressure hydrogen gas to the first stage.

In such embodiments, once the pressure of the compressed hydrogen gas in storage falls to about the inlet pressure of the first stage, the method may comprise:
- reducing further the pressure of the compressed hydrogen gas withdrawn from storage to produce reduced pressure hydrogen gas at an inlet pressure to a second stage of the multistage compression system upstream of the first stage (a second intermediate pressure); and
- feeding the reduced pressure hydrogen gas to the second stage.

It will be understood that the terms "first stage" and "second stage" in this context do not refer to the relative positions of the stages in the multistage compression system in the downstream direction during normal operation. In contrast, the terms are merely intended to reflect the order of the stages to which reduced pressure hydrogen gas is fed to the multistage compression system during periods when demand exceeds production. The terms "first intermediate pressure" and "second intermediate pressure" should be interpreted accordingly with the first intermediate pressure being higher than the second intermediate pressure.

These embodiments may further comprise feeding reduced pressure hydrogen gas to other stages of the multistage compression system upstream of the first and second stages. In these further embodiments, the pressure of the compressed hydrogen gas withdrawn from storage is reduced to the inlet pressure to the respective stages.

In some preferred embodiments, the second stage is the initial stage of the multistage compression system.

It will be appreciated that, in embodiments where reduced pressure hydrogen gas is fed to a second stage after the first stage, gas flow to the first stage is stopped when gas flow to the second stage starts. Generally speaking, flow of reduced pressure hydrogen gas to a given compression stage is stopped when flow of reduced pressure hydrogen gas to another compression stage starts.

Since hydrogen gas can be returned from storage to an intermediate stage and/or the initial stage of the multistage compression system, the compressed hydrogen gas may be stored at a pressure down to a minimum of about 5 bar, perhaps even down to a minimum of about 1.3 bar.

In embodiments in which compressed hydrogen gas is further compressed before being stored, another option would be for compressed hydrogen gas withdrawn from storage to be fed, after suitable pressure reduction, directly to the downstream process(es) until the storage pressure falls to the feed pressure of the downstream processes. At that point, the pressure of the compressed hydrogen gas withdrawn from storage would be reduced further and the reduced pressure hydrogen gas fed to a stage of the multistage compression system in accordance with the present invention. However, these embodiments are not preferred, e.g. because of the additional capital expense of the high-pressure storage system.

Compared to a high-pressure hydrogen storage system with discharge only to the feed pressure of a downstream process, this enables the storage volume of hydrogen to be reduced by using the multistage compression system that is already present in the process to recompress hydrogen from storage when the storage pressure drops below that feed pressure. The hydrogen can thereby continue to be taken from storage until the storage pressure falls to a minimum of the feed pressure to the multistage compression system.

Additional compression power is required during periods when hydrogen production is limited by lack of power to the electrolysers, but the additional compression power can be minimised by supplying hydrogen at the highest compressor inter-stage pressure possible given the storage pressure at a particular time. It also allows the maximum hydrogen storage pressure to be at or below the feed pressure of the downstream process to eliminate any additional compression requirement for hydrogen to storage.

It will be appreciated that the same volume of gas is stored in the same storage volume at the same maximum pressure and that reducing the minimum storage pressure increases the "releasable" volume of gas from storage, i.e. the usable volume of stored gas.

Where hydrogen is produced and then compressed in a multistage compression system for use in at least one downstream process, the releasable volume of stored hydrogen may be increased by returning hydrogen from storage to a stage in the multistage compression system rather than directly to the downstream process—this arrangement reduces the overall storage vessel volume required by the process.

By way of example, storage from a maximum pressure of 200 bar to a minimum pressure of 1.5 bar requires 15% less storage vessel volume for a given mass of releasable hydrogen compared to storage from a maximum pressure of 200 bar to a minimum pressure of 30 bar.

Similarly, storage from a maximum pressure of 100 bar to a minimum pressure of 1.5 bar requires 30% less storage vessel volume for a given mass of releasable hydrogen compared to storage from a maximum pressure of 100 bar to a minimum pressure of 30 bar.

In addition, storage from a maximum pressure of 50 bar to a minimum pressure of 1.5 bar requires 60% less storage vessel volume for a given mass of releasable hydrogen compared to storage from a maximum pressure of 50 bar to a minimum pressure of 30 bar.

Further, storage from a maximum pressure of 30 bar to a minimum pressure of 1.5 bar is feasible compared to 30 bar to 30 bar which would allow no storage.

Moreover, although the total storage vessel volume increases as the maximum storage pressure is reduced, the lower design pressure makes the vessel walls thinner and can reduce the overall capital cost of the storage system. The vessel thickness is often limited to a maximum value by considerations such as manufacturability, and in that case the lower design pressure will lead to fewer vessels (although each vessel will be larger). Furthermore, the allowable stress for the design of a vessel may be increased below a particular vessel wall thickness, and if the lower design pressure allows the thickness to be below this threshold, the total vessel metal mass (and therefore the total cost) can be reduced.

In embodiments where the method comprises storing and re-using excess hydrogen, the method preferably comprises dosing the hydrogen gas with nitrogen gas upstream of the point at which any reduced pressure hydrogen gas is fed from storage. This enables the concentration of nitrogen gas in the nitrogen-blended hydrogen gas to remain constant, as the reduced pressure hydrogen gas is not dosed with a second quantity of nitrogen gas upon recycle.

Method of Using a Centrifugal Compressor

According to a second aspect of the present invention, there is provided a method of using a centrifugal compressor for compressing hydrogen gas, the method comprising dosing hydrogen gas with nitrogen gas upstream of the centrifugal compressor to provide a nitrogen-blended hydrogen gas and compressing the nitrogen-blended hydrogen gas in the centrifugal compressor.

In so far as they are compatible, it will be appreciated that the above-described features in connection with the first aspect of the invention are equally applicable to the second aspect, and vice versa.

The amount of nitrogen that is fed to the hydrogen gas to dose it may depend on the amount of water present in the hydrogen gas. It may also depend on at which point the nitrogen gas is being fed to the multistage compression system.

In some embodiments, after dosing, the nitrogen-blended hydrogen gas comprises less than 25 mol %, or up to about 20 mol %, or up to about 15 mol %, or up to about 10 mol %, or preferably up to about 5 mol % of nitrogen gas.

In some embodiments, after dosing, the nitrogen-blended hydrogen gas comprises at least about 0.05 mol %, or at least about 0.1 mol %, or at least about 0.5 mol %, or at least about 1 mol %, or preferably about 2 mol % or more of nitrogen gas.

In some embodiments, after dosing, the nitrogen-blended hydrogen gas comprises from about 0.5 mol. % to 10 mol. %, or from about 1 mol % to about 5 mol %, or from about 2 mol % to about 4 mol %, or preferably about 3 mol %, of nitrogen gas.

Alternatively, it is possible to define the amount of nitrogen to be added based on the desired apparent molecular weight, as this can be measured. In some embodiments, the hydrogen gas is dosed with an amount of nitrogen gas such that the apparent molecular weight (in g/mol) of the resultant nitrogen-blended hydrogen gas is from about 2.05 to about 7, e.g. from about 2.1 to about 5, or from about 2.5 to about 4, or preferably from about 2.5 to about 3.5.

In some embodiments, the hydrogen gas is dosed with an amount of nitrogen gas such that the apparent molecular weight of the nitrogen-blended hydrogen gas is greater than the apparent molecular weight of the unblended hydrogen gas (i.e. hydrogen gas obtained from electrolysis of water or from a storage system) by an amount in a range from about 0.1 to about 3.0, e.g. from about 0.5 to about 2.0, or preferably by about 0.7 to about 1.5.

As previously mentioned, by dosing the hydrogen gas with nitrogen gas, the apparent molecular weight of the hydrogen gas being fed into a compressor is thereby increased. This enables the centrifugal compressor to generate enough centrifugal force to provide the specified pressure ratio (the discharge pressure divided by the inlet pressure). This, in turn, allows hydrogen gas to be compressed in a multistage compression system with fewer stages.

APPARATUS

According to a third aspect of the present invention, there is provided an apparatus for supplying hydrogen gas for consumption in at least one downstream process, the apparatus comprising:

a plurality of electrolysers arranged in parallel for electrolysing water to provide hydrogen gas;

an electricity generation system for generating electricity to power the plurality of electrolysers, the electricity generation system being in electrically conductive communication with the plurality of electrolysers;

a multistage compression system for compressing the hydrogen gas to provide a compressed hydrogen gas, the multistage compression system comprising a feed end, an outlet end and at least one centrifugal compression stage, the feed end being in fluid flow communication with the plurality of electrolysers;

a nitrogen gas source for supplying nitrogen gas, wherein the source is arranged to dose the hydrogen gas with nitrogen gas upstream of the centrifugal compression stage(s) in the multistage compression system; and at least one downstream processing unit arranged to receive at least a portion of the compressed hydrogen gas dosed with nitrogen gas, the downstream processing unit(s) being in fluid flow communication with the outlet end of the multistage compression system.

Electrolysers

The electrolysis of water is provided by a plurality of electrolysis units or "cells". Each unit or cell may be referred to as an "electrolyser".

The plurality of electrolysers may have a total capacity of at least 1 GW. The maximum total capacity of the electrolysers is limited only by practical considerations, e.g. generating sufficient power from the renewable energy source(s) to power the plurality of electrolysers. Thus, the electrolysers may have a maximum total capacity of 10 GW or more. The total capacity of the electrolysers conducting the electrolysis may be from 1 GW to 5 GW, e.g. from about 1.5 GW to about 3 GW.

The plurality of electrolysers usually consists of a large number, e.g. hundreds, of individual cells combined into "modules" that also include process equipment, e.g. pumps, coolers, and/or separators, etc., and groups of these modules are typically arranged in separate buildings.

Each module typically has a maximum capacity of at least 10 MW, e.g. 20 MW, and each building typically has a total capacity of at least 100 MW, e.g. 400 MW.

Any suitable type of electrolyser may be used with the present invention. In this regard, there are three conventional types of electrolyser—alkaline electrolysers, PEM electrolysers and solid oxide electrolysers—and each of these types of electrolyser is in theory suitable for use with the present invention.

Alkaline electrolysers operate via transport of hydroxide ions (OH$^-$) through the electrolyte from the cathode to the anode with hydrogen being generated on the cathode side. Electrolysers using a liquid alkaline solution of sodium hydroxide or potassium hydroxide as the electrolyte are commercially available. Commercial alkaline electrolysers typically operate at a temperature in the range of about 100° C. to about 150° C.

In a PEM electrolyser, the electrolyte is a solid plastics material. Water reacts at the anode to form oxygen and positively charged hydrogen ions. The electrons flow through an external circuit and the hydrogen ions selectively move across the PEM to the cathode. At the cathode, hydrogen ions combine with electrons from the external circuit to form hydrogen gas. PEM electrolysers typically operate at a temperature in the range of about 70° C. to about 90° C.

Solid oxide electrolysers use a solid ceramic material as the electrolyte that selectively conducts negatively charged oxygen ions ($O^{2-}$) at elevated temperatures. Water at the cathode combines with electrons from the external circuit to form hydrogen gas and negatively charged oxygen ions. The oxygen ions pass through the solid ceramic membrane and react at the anode to form oxygen gas and generate electrons for the external circuit. Solid oxide electrolysers must operate at temperatures high enough for the solid oxide membranes to function properly, e.g. at about 700° C. to about 800° C.

Due to the lower operating temperatures, the use of alkaline electrolysers and/or PEM electrolysers are typically preferred.

The plurality of electrolysers may be arranged in at least two parallel groups. In these embodiments, the apparatus comprises:
 a first header to collect hydrogen gas from each electrolyser in each group; and
 a second header to collect hydrogen gas from the first headers and feed the hydrogen gas to the feed end of the multistage compression system.

In some embodiments, the nitrogen gas source is arranged to feed nitrogen gas to at least one of the first headers, thereby dosing the hydrogen gas with nitrogen gas. Preferably, the nitrogen gas source is arranged to feed nitrogen gas to each of the first headers.

In some embodiments, wherein the apparatus further comprises a storage system for excess hydrogen, the apparatus comprises a conduit for feeding compressed nitrogen-blended hydrogen gas from the storage system after suitable pressure reduction to the second header.

Electricity Generation System for Electrolysers

Electricity for the electrolysis may be generated from any suitable energy source, including renewable or non-renewable energy sources. Preferably, the electricity may be generated from at least one renewable energy source, e.g. wind energy and/or solar energy.

In embodiments in which wind energy is used to generate electricity, the electricity generation system will comprise a plurality of wind turbines. In embodiments in which solar energy is used to generate electricity, the electricity generation system will comprise a plurality of photovoltaic cells, or "solar cells".

Some embodiments will comprise a plurality of wind turbines and a plurality of photovoltaic cells.

The expression "electrically conductive communication" will be understood to mean that appropriate wires and/or cables will be used, together with any other relevant equipment, to connect the electricity generation system with the electrolysers in a safe and efficient manner.

Multistage Compression System

In the present invention, the multistage compression system comprises at least one centrifugal compression stage. As mentioned above, the multistage compression system may comprise a plurality of stages typically having a compression ratio in the range of about 1.5 to about 2.5, e.g. about 2 to about 2.5. Inter-coolers are typically provided between adjacent stages, and after-coolers may be required after a final stage.

The stages of a multistage compression system are also arranged in one or more compression sections. Each section may comprise one or more stages of compression, together with the associated coolers.

In particular embodiments, the multistage compression system has two sections, a first (low pressure or "LP") section in which hydrogen gas is compressed from the feed pressure to the multistage compression system to a first elevated pressure, and a second (medium pressure or "MP") section in which hydrogen gas is compressed from the first elevated pressure to the final elevated pressure desired for the downstream process(es).

An LP section may have one or more, e.g. two, stages of compression and an MP section may have two or more, e.g. 3 or 4, stages of compression. In some embodiments, the LP and MP sections may both comprise centrifugal compression stages. In other embodiments, the LP and/or MP section may comprise a combination of centrifugal and reciprocating compressors. In some embodiments, the LP section comprises at least one centrifugal compression stage, and the MP section comprises at least one reciprocating compression stage. In some embodiments, the LP section comprises at least one centrifugal compression stage, and the MP section comprises centrifugal and/or reciprocating compression stages. It will be envisaged that in some particularly preferred embodiments all stages of the multistage compression system are centrifugal compression stages.

By way of example, for a process having a total electrolyser capacity of 1 GW, the multistage compression system may have from 2 to 4 compressors. The skilled person would appreciate that a process having a higher total capacity would require a greater number of compressors, i.e. 5 compressors in a multistage compression system for a process having a total electrolyser capacity of 2GW.

Compressors in an LP section may be oversized as appropriate, e.g. by 10%, to accommodate the loss of a machine. Additionally or alternatively, the multistage compression system may comprise a spare compressor in either the LP or an MP section which would cut-in to replace another machine in the relevant section that had broken down.

As will be explained in more detail below, the hydrogen gas will be dosed with nitrogen gas upstream of at least one centrifugal compression stage in the multistage compression system. Therefore, in the following discussion, references to "hydrogen gas" being collected from a compressor may also refer to "nitrogen-blended hydrogen gas" for embodiments where nitrogen gas has been added upstream of the particular centrifugal compression stage. In any case, it will be appreciated that the hydrogen gas after the last stage of compression will have been dosed with nitrogen at some point upstream.

As mentioned above, the multistage compression system may comprise a single section. In these embodiments, the section may comprise a plurality of compressors arranged in parallel, each compressor comprising at least one centrifugal compression stage. The apparatus may further comprise a third header to collect compressed hydrogen gas from each compressor and feed the compressed hydrogen gas containing nitrogen to the at least one downstream processing unit, or to a purification system upstream of at least one downstream process unit.

In some embodiments where a storage system is used, the apparatus may further comprise a conduit for feeding compressed nitrogen-blended hydrogen gas from the storage system after suitable pressure reduction to the second header.

However, the multistage compression system may comprise:
 a first section comprising a plurality of compressors arranged in parallel, each compressor comprising at least one stage; and
 a second section downstream of the first section, the second section comprising a plurality of compressors arranged in parallel, each compressor comprising at least two stages arranged in series.

In these embodiments, the apparatus may comprise:
- a third header to collect compressed hydrogen gas from each compressor in the first section and feed the compressed hydrogen gas to the compressors of the second section; and
- a fourth header to collect compressed hydrogen gas from each compressor in the second section and feed compressed nitrogen-blended hydrogen gas to the downstream processing unit(s), or to a purification system upstream of the downstream process unit(s).

In some embodiments where a storage system is used, the apparatus may further comprise a conduit for feeding compressed nitrogen-blended hydrogen gas from the storage system after suitable pressure reduction to the third header.

The plurality of electrolysers may be arranged in at least two groups. In these embodiments, the multistage compression system may comprise:
- a first section comprising a plurality of compressors arranged in parallel in at least two groups, each compressor comprising at least two stages arranged in series; and
- a second section downstream of the first section, the second section comprising a plurality of compressors arranged in parallel, each compressor comprising at least two stages arranged in series.

The apparatus may further comprise:
- at least two first headers, each first header to collect hydrogen gas from each electrolyser in a group and feed the hydrogen gas to the feed end of a respective group of compressors in the first section of the multistage compression system;
- a second header to collect compressed hydrogen gas from each group of compressors in the first section and feed the compressed hydrogen gas to the compressors of said second section; and
- a third header to collect compressed hydrogen gas from each compressor in the second section and feed the compressed nitrogen-blended hydrogen gas to the downstream processing unit(s), or to a purification system upstream of the downstream process unit(s).

In some embodiments, a nitrogen gas source is arranged to feed nitrogen gas to at least one of the first headers, thereby dosing the hydrogen gas with nitrogen gas. Preferably, the nitrogen source is arranged to feed nitrogen gas to each of the first headers. In such embodiments, the group of compressors in the first stage and/or the compressors of the second stage comprise centrifugal compressors.

In other embodiments, a nitrogen gas source is arranged to feed nitrogen gas to the second header, thereby dosing the compressed hydrogen gas with nitrogen gas. In such embodiments, the compressors of the second section comprise centrifugal compressors.

In some embodiments where a storage system is used, the apparatus may further comprise a conduit for feeding compressed nitrogen-blended hydrogen gas from the storage system after suitable pressure reduction to at least one of said first headers. Additionally or alternatively, the apparatus of these embodiments may comprise a conduit for feeding compressed nitrogen-blended hydrogen gas from the storage system after suitable pressure reduction to the second header.

Purification System

In embodiments where the downstream process(es) cannot tolerate the levels of water and oxygen inherently present in the compressed hydrogen gas produced by the electrolysis of water, the apparatus may comprise a purification system in which the compressed hydrogen gas is purified.

The purification system will typically comprise a "DeOxo" unit in which oxygen is removed by the catalytic combustion of hydrogen to produce water and oxygen-depleted compressed hydrogen gas. The purification system described in the context of the present invention does not substantially remove any nitrogen from the nitrogen-blended hydrogen gas.

The oxygen-depleted gas may then be dried in a drier, e.g. an adsorption unit, such as a temperature swing adsorption (TSA) unit, to produce dry compressed hydrogen gas for the downstream process(es).

Downstream Processing Unit(s)

A downstream processing unit may be any unit that utilises hydrogen gas as a feedstock.

Examples of suitable downstream processing units include an oil refinery, a steel manufacturing facility, or an ammonia synthesis plant. Preferably, the downstream processing unit is or includes an ammonia synthesis plant.

Nitrogen Gas Source

The apparatus comprises a nitrogen gas source. It will be appreciated that the nitrogen gas may be fed from any suitable nitrogen gas source. For example, the nitrogen gas source may be a cryogenic air separation unit (ASU) which produces nitrogen by cryogenic distillation, at a pressure at which the nitrogen gas is taken from the ASU, known as the discharge pressure, e.g. about 10 bar.

In some embodiments, the nitrogen gas is taken from an ASU at a pressure lower than the discharge pressure and then fed to the hydrogen gas. For example, the nitrogen gas may be taken from an ASU at a pressure of around 4 bar, or around 1.1 bar. This enables the ASU to consume less power overall, as less nitrogen gas is compressed to the discharge pressure.

The nitrogen gas source will be connected to a feed line which delivers the nitrogen gas to the hydrogen gas upstream of at least one stage of the multistage compression system. The feed line may comprise a valve for reducing the pressure of the nitrogen gas accordingly.

For example, where the nitrogen gas is to be fed to the hydrogen gas obtained from electrolysis, the valve will reduce the pressure of the nitrogen gas to a pressure just over atmospheric pressure (e.g. about 1.1 bar). In other examples, where the nitrogen gas is to be fed to the hydrogen gas at an inter-stage of the multistage compression system, the apparatus may include a valve for reducing the pressure to the inlet pressure for the feed of the inter-stage. Alternatively, the apparatus may include a compressor which raises the pressure of the nitrogen gas such that it has a pressure substantially the same as the inlet pressure for the feed of the inter-stage.

In embodiments where the downstream process(es) consumes nitrogen gas, such as when the downstream process(es) includes ammonia synthesis, the nitrogen gas source may additionally supply the additional nitrogen gas required for the downstream process. In such embodiments, the additional nitrogen gas will typically be compressed in a compressor to a suitable pressure in preparation for the downstream process. Or alternatively, the additional nitrogen is first added to the feed to the downstream process, the feed then being subsequently compressed in a compressor to a pressure suitable for the downstream process.

For example, the nitrogen gas will be at a pressure up to a maximum pressure of the pressure to which the hydrogen is compressed in the multistage compression system, e.g. a pressure up to a maximum of about the feed pressure of the downstream process (where there is only one) or about the feed of one of the downstream processes (if there are more than one).

In other embodiments, the nitrogen gas for dosing of the hydrogen gas is supplied from a separate nitrogen source.

Storage System

In some embodiments, the apparatus comprises a hydrogen gas storage system for storing compressed nitrogen-blended hydrogen gas. In such embodiments, the storage system is in fluid flow communication with the outlet end of the multistage compression system and at least one compression stage of the multistage compression system.

The storage system typically comprises a number of pressure vessels and/or pipe segments connected to a common inlet/outlet header.

The pressure vessels may be spheres, e.g. up to about 25 m in diameter, or "bullets", i.e. horizontal vessels with large L/D ratios (typically up to about 12:1) with diameters up to about 12 m.

Salt domes may also be used if the geology of the site allows.

Preferably, the nitrogen gas source is arranged to feed nitrogen gas to the hydrogen gas prior to, or upstream of, the point at which the storage system is in fluid flow communication with the at least one centrifugal compression stage of the multistage compression system. This enables the concentration of nitrogen gas in the nitrogen-blended hydrogen gas to remain constant, as the reduced pressure hydrogen gas released from storage is not dosed with a subsequent quantity of nitrogen gas.

Control System

In some embodiments, the apparatus comprises a control system for monitoring and controlling flow and/or pressure of the nitrogen gas from the nitrogen gas source to the hydrogen gas, wherein the flow is determined based on the rate of generation of hydrogen gas (or amount of generated hydrogen gas) by the electrolysers. It will be appreciated that the above features described in relation to the method of the present invention could be implemented using such a control system.

In some embodiments, the control system may be configured to monitor the amount of the hydrogen gas generated by the electrolysis by measurement. Such measurement may be made by direct flow measurements, or alternatively inferred through measurements of the electrolyser current, for example.

In some embodiments, the control system may implement a feedback loop, which takes into account information about the concentration of nitrogen gas in the nitrogen-blended hydrogen gas. Such information may be determined by measurement of the gas composition, for example by using a mass spectrometer or density meter.

By determining the amount of nitrogen gas to be added based on the amount of hydrogen, this enables the concentration of the nitrogen to be carefully controlled. For example, it advantageously allows the nitrogen concentration to be kept constant despite variations in the amount of hydrogen gas.

In embodiments where a storage system is used, the apparatus may comprise a control system which controls not only the pressure and flow of compressed hydrogen from the multistage compression system to the storage system, e.g. during periods when hydrogen production exceeds demand, but also the pressure and flow of compressed hydrogen gas to the multistage compression system from the storage system, e.g. during periods when hydrogen demand exceeds production.

In some embodiments, the control system would simply seek to maintain the pressure of hydrogen gas in a downstream header to the downstream process. Thus, in order to continually provide a given amount of hydrogen to the downstream process, a pressure controller would be maintained on a discharge header that feeds the downstream process.

If the pressure in the discharge header exceeded the required feed pressure (e.g. because there is more hydrogen available than the downstream process is consuming), the pressure would be relieved by opening a valve in the feed line to storage.

Once the pressure in the discharge header dropped to the required feed pressure, the valve in the feed line to storage would be closed.

If the pressure in the discharge header dropped below the required feed pressure (e.g. because there is less hydrogen available than the downstream process is consuming), the pressure would be increased by opening a valve in a first return line from storage to a first stage in the multistage compression system.

The valve in the first return line would remain open until such time that the pressure in the discharge header exceeded the required feed pressure, indicating that the level of hydrogen production has returned to the required level, at which point the valve would be closed, or until the pressure in the storage vessel drops to about the inlet pressure to the first stage of multistage compression system being fed by the first return line.

In the latter case, not only would the valve in the first return line be closed, but also a valve in a second return line from storage to a second stage in the multistage compression system (upstream of the first stage) would be opened so as to continue to feed hydrogen from storage back to the downstream process.

Such a control system may be referred to as a "split range" control system.

Water Source

Any suitable source of water may be used with the present invention. However, in embodiments in which sea water is used to produce the water for the electrolysis, the apparatus would further comprise at least one unit (or plant) for desalination and demineralisation of the sea water.

Aspects of the invention include:

1. A method for supplying hydrogen gas for consumption in at least one downstream process, the method comprising:
  electrolysing water to provide hydrogen gas;
  compressing the hydrogen gas in a multistage compression system to provide compressed hydrogen gas; and
  feeding at least a portion of the compressed hydrogen gas to the downstream process(es);
  wherein the multistage compression system comprises at least one centrifugal compression stage;
  wherein the hydrogen gas is dosed with nitrogen gas upstream of the centrifugal compression stage(s); and
  wherein the nitrogen gas is present in the compressed hydrogen gas when fed to the downstream process(es).

2. A method according to #1, wherein after dosing, the hydrogen gas comprises the nitrogen gas in an amount in a range from about 0.5 mol % to about 10 mol %.

3. A method according to #1, wherein after dosing, the resultant nitrogen-blended hydrogen gas has an apparent molecular weight in a range from about 2.05 to about 7.

4. A method according to any of #1 to #3, wherein the hydrogen gas is dosed with the nitrogen gas upstream of an initial stage of the multistage compression system.

5. A method according to any of #1 to #3, wherein the hydrogen gas is dosed with the nitrogen gas downstream of an initial stage of the multistage compression system and upstream of an intermediate stage of the multistage compression system.

6. A method according to any of #1 to #5, wherein the centrifugal compression stage has a feed end and the hydrogen gas is dosed with the nitrogen gas at the feed end of the centrifugal compression stage.

7. A method according to any of #1 to #6, wherein the downstream process(es) consumes nitrogen.

8. A method according to #7, wherein further nitrogen gas is added as required to the compressed hydrogen gas upstream of the downstream process(es).

9. A method according to any of #1 to #8, wherein the multistage compression system comprises a first section and at least one further section downstream of the first section.

10. A method according to #9, wherein the hydrogen gas is dosed with the nitrogen gas upstream of an initial stage of the first section of the multistage compression system.

11. A method according to #9, wherein the hydrogen gas is dosed with the nitrogen gas downstream of the first section and upstream of an initial stage of the at least one further section of the multistage compression system.

12. A method according to any of #1 to #10, wherein during periods when more hydrogen gas is produced by the electrolysis than is required for the downstream process(es), the method comprises feeding excess compressed hydrogen gas to storage, optionally after further compression;

wherein during periods when more hydrogen gas is required for the downstream process(es) than is produced by the electrolysis, the method comprises withdrawing compressed hydrogen gas from storage and, after suitable pressure reduction, feeding the reduced pressure hydrogen gas to a stage of the multistage compression system, and wherein the compressed hydrogen gas is stored containing the nitrogen gas.

13. A method according to #12, wherein the hydrogen gas is dosed with the nitrogen gas upstream of the stage of the multistage compression system to which the reduced pressure hydrogen gas is fed during periods when more hydrogen gas is required than is produced by the electrolysis.

14. A method according to any of #1 to #13, wherein the amount of hydrogen gas being provided by the electrolysis of water is variable, and the hydrogen gas is dosed with the nitrogen gas in an amount determined based upon the amount of hydrogen gas being provided by the electrolysis.

15. A method of using a centrifugal compressor for compressing hydrogen gas, the method comprising dosing hydrogen gas with nitrogen gas upstream of the centrifugal compressor to provide a nitrogen-blended hydrogen gas and compressing the nitrogen-blended hydrogen gas in the centrifugal compressor.

16. Apparatus for supplying hydrogen gas for consumption in at least one downstream process, the apparatus comprising:

a plurality of electrolysers arranged in parallel for electrolysing water to provide hydrogen gas;

an electricity generation system for generating electricity to power the plurality of electrolysers, the electricity generation system being in electrically conductive communication with the plurality of electrolysers;

a multistage compression system for compressing the hydrogen gas to provide a compressed hydrogen gas, the multistage compression system comprising a feed end, an outlet end and at least one centrifugal compression stage, the feed end being in fluid flow communication with the plurality of electrolysers via a feed header;

a nitrogen gas source for supplying nitrogen gas, wherein the source is arranged to dose the hydrogen gas with nitrogen gas upstream of the centrifugal compression stage(s) in the multistage compression system; and at least one downstream processing unit arranged to receive at least a portion of the compressed hydrogen gas dosed with nitrogen gas, the downstream processing unit(s) being in fluid flow communication with the outlet end of the multistage compression system.

17. Apparatus according to #16, wherein the nitrogen gas source is arranged to feed nitrogen gas to the feed header to dose the hydrogen gas with nitrogen gas, and the multistage compression system contains a single section, the section comprising a plurality of compressors arranged in parallel, each compressor comprising at least one centrifugal compression stage; the apparatus further comprising a header to collect compressed hydrogen gas from each compressor and feed the compressed hydrogen gas containing nitrogen to the downstream processing unit(s), or to a purification system upstream of the downstream process unit(s).

18. Apparatus according to #16 or #17, wherein the multistage compression system comprises:

a first section comprising a plurality of compressors arranged in parallel, each compressor comprising at least one centrifugal compression stage; and a second section downstream of said first section, said second section comprising a plurality of compressors arranged in parallel, each compressor comprising at least two centrifugal compression stages arranged in series;

the apparatus comprising:

a first header to collect compressed hydrogen gas from each compressor in the first section and feed the compressed hydrogen gas to the compressors of the second section; and a second header to collect compressed hydrogen gas from each compressor in the second section and feed the compressed hydrogen gas containing nitrogen gas to the downstream processing unit(s), or to a purification system upstream of the downstream processing unit(s), wherein the nitrogen gas source is arranged to feed nitrogen gas to the feed header to dose the hydrogen gas with nitrogen gas.

19. Apparatus according to any of #16 to #18 wherein said plurality of electrolysers is arranged in at least two groups, and the multistage compression system comprises:

a first section comprising a plurality of compressors arranged in parallel in at least two groups, each compressor comprising at least two centrifugal compression stages arranged in series; and a second section downstream of the first section, the second section comprising a plurality of compressors arranged in parallel, each compressor comprising at least two centrifugal compression stages arranged in series;

the apparatus comprising:

at least two first headers, each first header to collect hydrogen gas from each electrolyser in a group and feed the hydrogen gas to the feed end of a respective group of compressors in the first section of the multistage compression system,
wherein the nitrogen gas source is arranged to feed nitrogen gas to each of the first headers to dose the hydrogen gas with nitrogen gas;
a second header to collect compressed hydrogen gas from each group of compressors in the first section and feed the compressed hydrogen gas to the compressors of the second section; and
a third header to collect compressed hydrogen gas from each compressor in the second section and feed the compressed hydrogen gas to the downstream processing unit(s), or to a purification system upstream of the downstream processing unit(s).

20. Apparatus according to any of #16 to #19, comprising a control system for controlling flow of nitrogen gas from the nitrogen gas source to the hydrogen gas, the flow being determined based on the level of production of hydrogen gas by the electrolysers.

21. Apparatus according to any of #16 to #20, comprising a storage system for storing compressed hydrogen gas containing the nitrogen gas, the storage system being in fluid flow communication with the outlet end of the multistage compression system and at least one compression stage of the multistage compression system, and
wherein the nitrogen gas source is arranged to dose the hydrogen gas with nitrogen gas upstream of the point at which the storage system is in fluid flow communication with the at least one centrifugal compression stage of the multistage compression system.

The invention will now be described by example only and with reference to the figures in which.

In some of the following figures and examples a hydrogen storage system and in some cases a purification unit are shown. However, it will be appreciated that the present invention can be implemented without the use of a hydrogen storage system or purification unit, which are only shown here for completeness.

Figure 1:
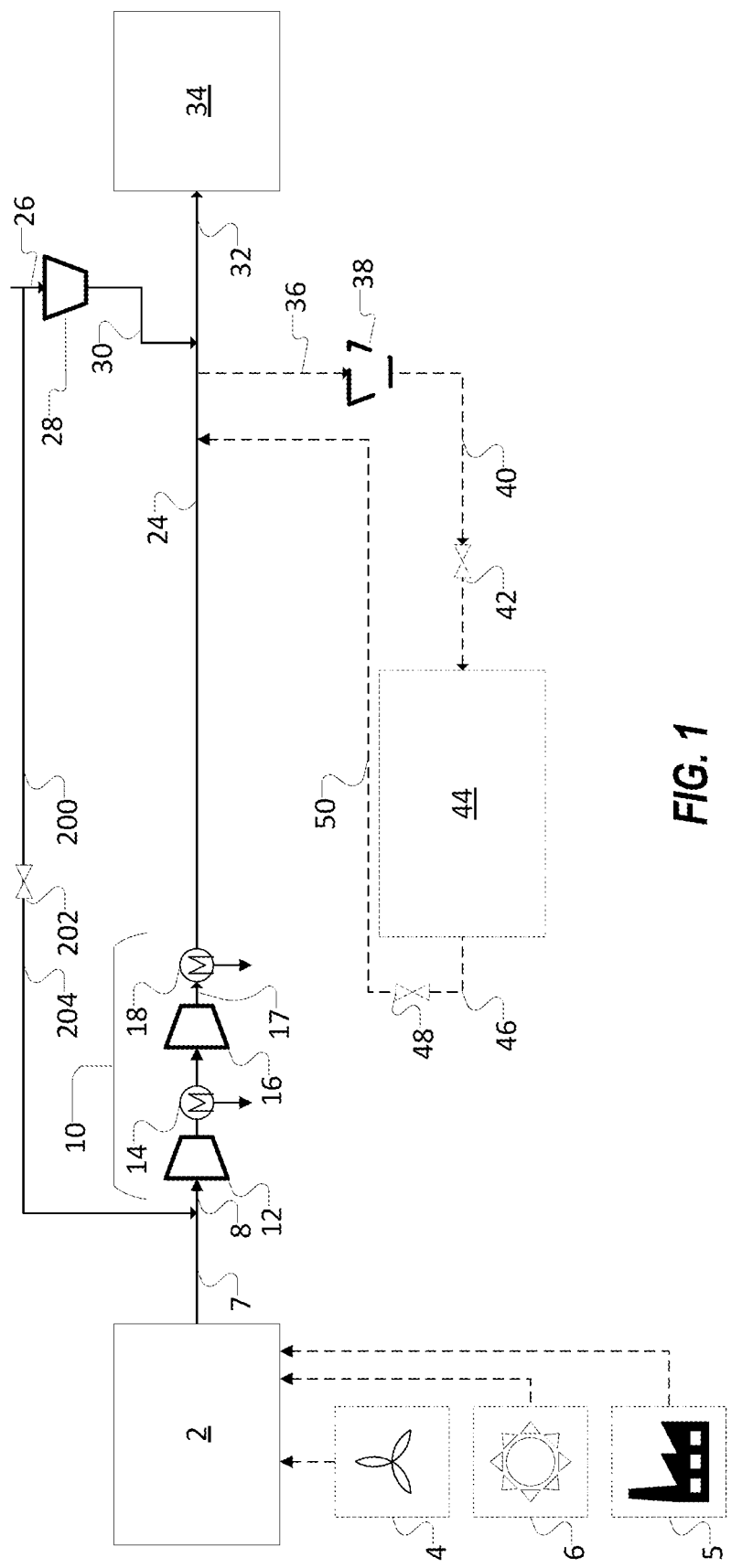
FIG. 1 is a simplified flowsheet for a first example of the present invention in which hydrogen is produced by electrolysis of water, dosed with nitrogen gas, compressed and fed to a downstream ammonia plant, and in which excess hydrogen is stored at high pressure.
Figure 2:
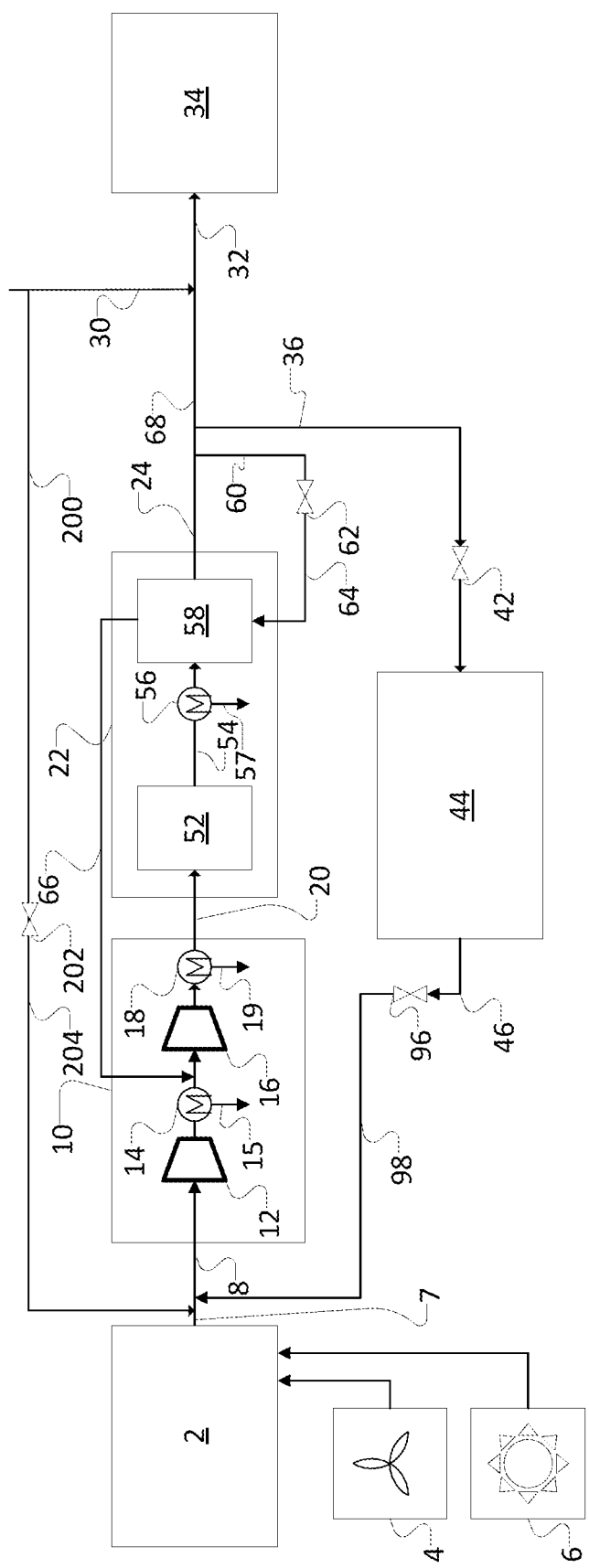
FIG. 2 is a simplified flowsheet for a second example of the present invention in which the multistage compression system has a single section, and in which a purification unit is shown.
Figure 3:
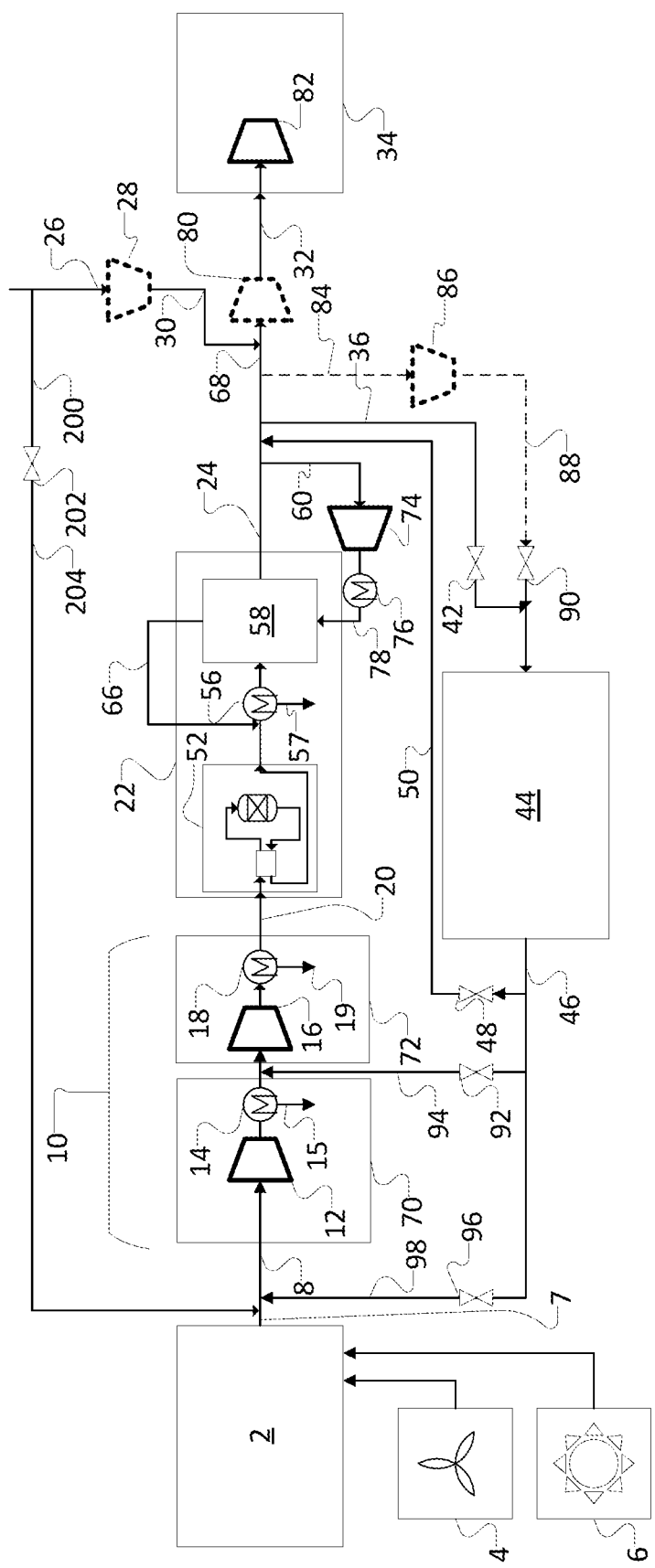
FIG. 3 is a simplified flowsheet for a third example of the present invention in which the multistage compression system has a low pressure (LP) section and a medium pressure (MP) section.

As mentioned above, the multistage compression system comprises a plurality of stages typically having a compression ratio in the range from about 1.5 to about 2.5, e.g. about 2 to about 2.5. Inter-coolers are typically provided between adjacent stages, and after-coolers may be required after a final stage. In FIGS. 1 to 3, the multistage compression system is depicted for simplicity with one or two stages of compression with one intercooler and/or aftercooler.

According to FIG. 1, which shows a first example of the present invention, hydrogen is produced at about atmospheric pressure by electrolysis of water in a plurality of electrolyser units indicated generally by reference numeral 2. The electricity required to power the electrolysers may be generated at least in part by renewable energy sources such as the wind (indicated generally by unit 4) and/or the sun (indicated generally by unit 6) or may be generated by a diesel-, petrol- or hydrogen-powered generator (indicated generally by unit 5) or taken from a grid (not shown), or may be generated by a combination of these sources. A stream 7 of hydrogen is removed from the electrolysers 2 at a pressure just over atmospheric pressure (e.g. about 1.1 bar).

A stream 200 of nitrogen gas is produced by cryogenic distillation in an air separation unit (ASU; not shown). Stream 200 is at the discharge pressure of the ASU, e.g. about 10 bar, and reduced in pressure across valve 202 to a pressure just over atmospheric pressure (e.g. about 1.1 bar) to provide stream 204 of nitrogen gas. The stream 204 of nitrogen gas is fed to the stream 7 of hydrogen gas to provide a hydrogen gas stream 8 which is dosed with nitrogen gas to produce hydrogen gas stream 8 containing about 3 mol % nitrogen.

Nitrogen-blended hydrogen gas feed 8 is then fed to the initial stage 12 of the multistage compression system 10 (indicated schematically in the figure as having a first centrifugal compression stage 12, an intercooler 14, a second centrifugal compression stage 16 and an aftercooler 18) to produce a stream 24 of compressed nitrogen-blended hydrogen gas at a pressure between 20 bar to 40 bar. In order to achieve such high pressure, the multistage compression system usually has at least two compression sections.

As indicated above, the hydrogen gas from the electrolysers is usually wet (saturated at 40° C.) and contains some oxygen (typically, 500 ppm to 1000 ppm). The hydrogen gas is therefore purified in a purification unit (not shown) located at an intermediate point of the multistage compression system, typically at a location where the pressure is in the range from about 20 bar to about 40 bar, e.g. about 30 bar. In this regard, oxygen is removed by the catalytic combustion of some of the hydrogen to form water in a "DeOxo" unit (not shown) and the oxygen-depleted hydrogen gas (containing no more than 1 ppm $O_2$) is dried by adsorption in a drier unit (not shown). Stream 17 of purified compressed hydrogen typically contains no more than 5 ppm total oxygen, including 1 ppm water.

A stream 26 of nitrogen gas is produced by cryogenic distillation in an air separation unit (ASU; not shown) and compressed in compressor 28 to produce a stream 30 of compressed nitrogen gas having a purity of about 99.99% at a pressure between 20 bar to 40 bar. Stream 30 is then combined with stream 24 of compressed nitrogen-blended hydrogen gas to form a combined stream 32 of ammonia synthesis gas containing 25 mol % nitrogen gas and 75 mol % hydrogen gas which is fed to an ammonia synthesis plant 34.

Optionally, during periods when more hydrogen gas is produced by the electrolysis than is required for the ammonia plant 34, a stream 36 of excess compressed nitrogen-blended hydrogen gas may be removed, fed to compressor system 38 where it is compressed to 200 bar, for example, before being sent as stream 40 (via control valve 42) to storage 44.

Optionally, during periods when the ammonia plant 34 requires more hydrogen gas than is produced by the electrolysis, a stream 46 of compressed nitrogen-blended hydrogen gas is removed from storage 44, depressurised through valve 48 to produce a stream 50 of reduced pressure hydrogen gas at a pressure between 20 bar to 40 bar which is fed to stream 24 to supplement the hydrogen feed to the ammonia plant 34.

FIG. 2 depicts a second example of the present invention. The same numerical references have been used to denote features of the flowsheet in FIG. 2 that are common to the flowsheet of FIG. 1. The following is a discussion of the features that distinguish the first embodiment of FIG. 2 from the process shown in FIG. 1.

Regarding FIG. 2, the multistage compression system 10 has a single section containing all of the compression stages (indicated generally as centrifugal compression stage 12 and centrifugal compression stage 16) and associated intercoolers and aftercooler(s) (indicated generally as coolers 14 and 18 generating condensate streams 15 and 19 respectively) and compresses the hydrogen gas in stream 8 from about atmospheric pressure to about 30 bar.

Further details of the purification unit 22 are also provided in FIG. 2. In this regard, the stream 20 of compressed nitrogen-blended hydrogen gas is fed to a "DeOxo" unit 52 within which residual oxygen is removed by catalytic conversion to water to produce a stream 54 of oxygen-depleted nitrogen-blended hydrogen gas which is cooled by indirect heat exchange in cooler 56, generating condensate stream 57, and then dried by adsorption in unit 58 to produce stream 24 of compressed nitrogen-blended hydrogen gas.

The adsorption beds in unit 58 are regenerated using a stream 60 of compressed nitrogen-blended hydrogen gas taken from stream 24. Stream 60 is depressurised to about 14 bar through valve 62 and the reduced pressure stream 64 used to regenerate the drier 58. The spent regeneration gas is returned as recycle stream 66 to the hydrogen gas stream in an intermediate stage of the multistage compression system 10 for recompression. The water therefore comes out in condensate stream 19.

A remaining part 68 of stream 24 is combined, possibly after pressure reduction if required, with stream 30 of nitrogen gas from an ASU (not shown) to form a synthesis gas stream 32 which is fed to the ammonia plant 34 where it is compressed (not shown) to the pressure required for ammonia synthesis.

Stream 36 of compressed nitrogen-blended hydrogen gas may be reduced in pressure through valve 42 if required and fed to a storage unit 44 where it is stored at a pressure up to a maximum of 26 bar. When required, stream 46 of nitrogen-blended hydrogen gas is removed and reduced in pressure across valve 96 before being returned as stream 98 to feed to the initial stage 12 of the multistage compression system 10.

Nitrogen gas feed 204 is fed to the stream 7 to provide a nitrogen-blended hydrogen gas stream 8. Accordingly, the reduced pressure hydrogen gas feed 98 is fed to the nitrogen-blended hydrogen gas stream 8 prior to it being fed to the initial stage 12 of the multistage compression system 10.

FIG. 3 depicts a third embodiment of the present invention. The same numerical references have been used to denote features of the flowsheet in FIG. 3 that are common to the flowsheets of FIGS. 1 and 2. The following is a discussion of the features that distinguish the second embodiment of FIG. 3 from the processes shown in FIGS. 1 and 2.

Multistage compression system 10 has an LP section 70 containing centrifugal compressors 12, intercoolers (not shown) and aftercoolers 14, and an MP section 72 containing centrifugal compressors 16, intercoolers (not shown) and aftercoolers 18.

Stream 7 of hydrogen gas is dosed with nitrogen gas from stream 204 to provide a nitrogen-blended hydrogen gas stream 8. Stream 8 is then fed to the LP section 70 where it is compressed from about 1.1 bar to about 5 bar and the discharge from the LP section 70 is fed to the MP section where it is compressed further to a pressure that is about 1 bar above the pressure at the point downstream where stream 68 is mixed with stream 30 of nitrogen gas.

Thus, where the pressure at the point at which the nitrogen-blended hydrogen and nitrogen are mixed is about 10 bar, the MP section 72 compresses the nitrogen-blended hydrogen gas to about 11 bar. Alternatively, where the pressure at the point at which the nitrogen-blended hydrogen and nitrogen are mixed is about 26 bar, the MP section 72 compresses the nitrogen-blended hydrogen gas to about 27 bar.

The stream 60 of purified nitrogen-blended hydrogen gas used to regenerate the drier 58 may be fed to a blower 74 and a heater 76 prior to being fed as stream 78 to the drier 58. Additionally, the stream 66 of spent regeneration gas may be recycled to the purification unit 22 at a point between the "DeOxo" unit 52 and the drier 58. The water removed in the drier 58 is therefore rejected from the system in condensate stream 57.

As mentioned above, stream 68 of compressed nitrogen-blended hydrogen gas may be mixed with stream 30 of nitrogen gas from the ASU (not shown) at the discharge pressure at which the nitrogen gas is taken from the ASU, e.g. about 10 bar. In these embodiments, the combined gas is compressed in a compressor system 80 to produce stream 32 of synthesis gas at a pressure of about 26 bar which is then fed to the ammonia plant 34 where it is further compressed in compression system 82 prior to being fed to the catalytic reactor (not shown).

Alternatively, stream 68 of compressed nitrogen-blended hydrogen gas may be mixed with stream 30 of nitrogen gas from the ASU (not shown) at the feed pressure to the ammonia plant, i.e. about 26 bar. In these embodiments, the stream 26 of nitrogen gas from the ASU is compressed in compression system 28 to produce compressed nitrogen gas at about 26 bar which is then mixed with the compressed nitrogen-blended hydrogen gas to produce stream 32 of synthesis gas. Stream 32 is then fed to the ammonia plant 34 where it is further compressed in compression system 82 prior to being fed to the catalytic reactor (not shown).

Dry nitrogen-blended hydrogen gas may be stored in the storage system 44 up to a maximum pressure of the feed pressure to the ammonia plant, i.e. about 26 bar. In these embodiments, stream 36 of compressed nitrogen-blended hydrogen gas is taken from stream 24, adjusted in pressure as appropriate across valve 42 and fed to the storage system.

Alternatively, the nitrogen-blended hydrogen may be stored at higher pressure, e.g. up to a maximum pressure of 50 bar or even 100 bar or more. In such embodiments, stream 84 of nitrogen-blended hydrogen gas is removed from stream 24, compressed in storage compression system 86 to form stream 88 which is adjusted in pressure across valve 90 as required before being fed to the storage system 44.

During periods when demand for hydrogen exceeds production, nitrogen-blended hydrogen from the storage system 44 may be fed in stream 50, after suitable pressure reduction (e.g. across valve 48), directly to the compressed nitrogen-blended hydrogen feed in the stream 24 to the ammonia plant 34. In some embodiments, nitrogen-blended hydrogen withdrawn from storage may be fed in stream 94, after suitable pressure reduction (e.g. across valve 92), to a point between the LP section 70 and the MP section 72 of the multistage compression system 10. In still further embodiments, nitrogen-blended hydrogen withdrawn from storage may be fed in stream 98, after suitable pressure reduction (e.g. across valve 96), to the feed to the initial centrifugal compression stage 12 of the LP section 70.

In some embodiments, nitrogen-blended hydrogen gas withdrawn from storage is fed in stream 50 to the ammonia plant 34 until the pressure in the storage system falls to about the feed pressure to the plant 34 at which point valve 48 would be closed and valve 92 opened. The withdrawn gas may then be fed in stream 94 to the point between the sections 70, 72 of the multistage compression system 10 until the pressure in the storage system falls to about the feed pressure to the MP section 72. At this point, valve 92 is closed and valve 96 opened thereby providing withdrawn gas in stream 98 to the feed to the initial centrifugal stage of multistage compression system 10.

This sequential approach to feeding hydrogen from storage to the downstream process has an advantage in that it represents a more energy efficient method for returning hydrogen to the process during periods where demand exceeds production compared to feeding hydrogen from storage only through line 98.

Figure 4:
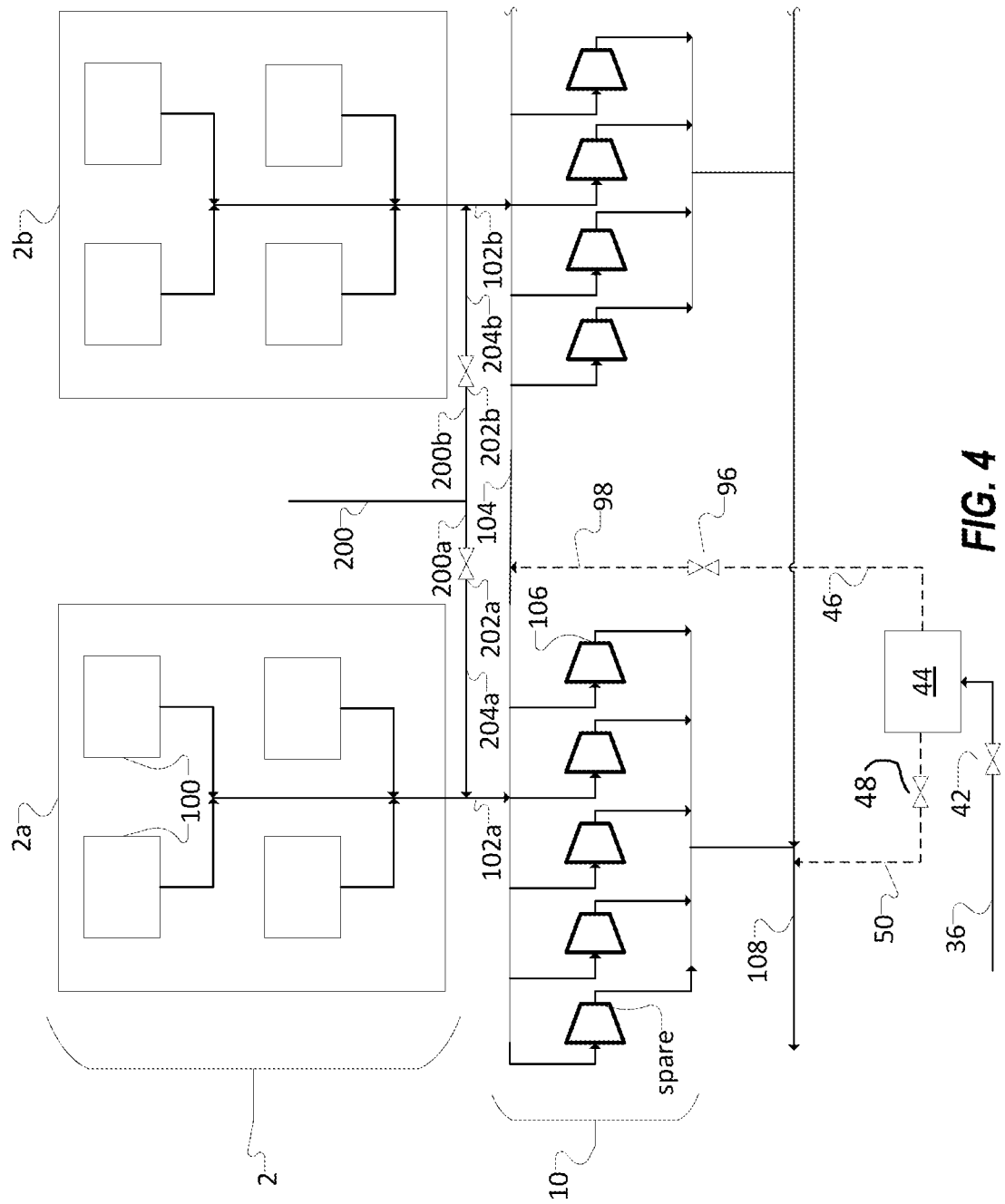
FIG. 4 is a further simplified flowsheet providing further details of one option for integrating the first embodiment of the invention with the process of FIG. 1.

FIG. 4 illustrates one arrangement of the electrolysers and the multistage compression system depicted in FIG. 2. The same numerical references have been used to denote features of the arrangement in FIG. 4 that are common to the previous figures. The following is a discussion of the distinguishing features of the arrangement.

In this regard, a plurality 2 of electrolyser units 100 are arranged in parallel within at least two parallel groups— group 2a and group 2b. Hydrogen gas produced in each unit 100 within group 2a is collected by a first header 102a and hydrogen gas produced each unit 100 within group 2b is collected by another first header 102b.

A nitrogen gas stream 200 is produced by cryogenic distillation in an air separation unit (ASU; not shown). Stream 200 is then split into two streams 200a and 200b.

Stream 200a is reduced in pressure across valve 202a to a pressure just over atmospheric pressure (e.g. about 1.1 bar) to provide stream 204a of nitrogen gas. The stream 204a of nitrogen gas is fed to the first header 102a to provide a hydrogen gas stream within header 102a which has been dosed with nitrogen gas.

Similarly, stream 200b is reduced in pressure across valve 202b to a pressure just over atmospheric pressure (e.g. about 1.1 bar) to provide stream 204b of nitrogen gas. The stream 204b of nitrogen gas is fed to the first header 102b to provide a hydrogen gas stream within header 102b which has been dosed with nitrogen.

Nitrogen-blended hydrogen gas is then collected from the first headers 102a, 102b by a second header 104.

The multistage compression system 10 has a plurality of centrifugal compressors 106 arranged in parallel. The nitrogen-blended hydrogen gas is distributed to the feed of each compressor by the second header 104.

Compressed nitrogen-blended hydrogen gas is collected from each compressor 106 by a third header 108 which then feeds the compressed nitrogen-blended hydrogen gas to the purification unit (not shown).

As indicated in the figure, the plurality 2 of electrolyser units 100 may include one or more further parallel groups 2c, etc. (not shown) of electrolyser units 100, each further group producing additional nitrogen-blended hydrogen gas by dosing with a nitrogen gas stream 204c, etc. (not shown) for collection by a further first header 102c, etc. (not shown) which would in turn be collected by an extension (not shown) of the second header 104.

In such embodiments, the multistage compression system 10 would include further compressors (not shown) arranged in parallel and nitrogen-blended hydrogen gas would be distributed to the feeds to the further compressors by the extension to the second header 104. In addition, compressed nitrogen-blended hydrogen gas would be collected from the further compressors by an extension (not shown) of the third header 108.

During periods when demand for hydrogen exceeds production, nitrogen-blended hydrogen gas from storage 44 may be fed in stream 98, after suitable pressure reduction (valve 96) to the second header 104 which distributes the gas feed to the compressors 106. Nitrogen-blended hydrogen gas from storage 44 may alternatively or subsequently be fed in stream 50, after suitable pressure reduction (valve 48), to the third header 108.

Figure 5:
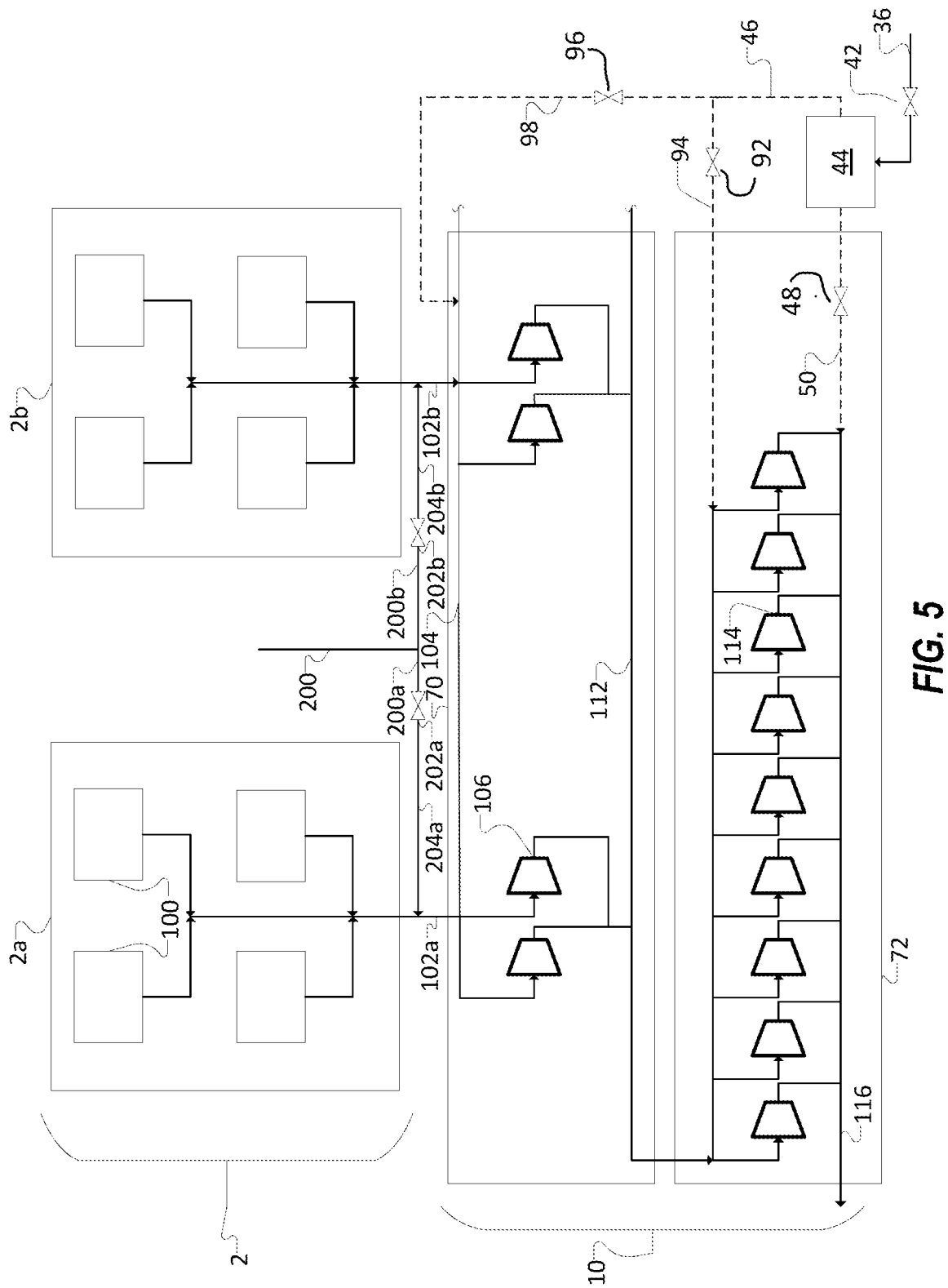
FIG. 5 is another simplified flowsheet providing further details of one option for integrating the second embodiment of the invention with the process of FIG. 1.

FIG. 5 illustrates one arrangement of the electrolysers and the multistage compression system depicted in FIG. 3. The same numerical references have been used to denote features of the arrangement in FIG. 5 that are common to the previous figures. The following is a discussion of the distinguishing features of this arrangement.

The multistage compression system 10 has an LP section 70 comprising a plurality of centrifugal compressors 106 arranged in parallel. A third header 112 collects compressed nitrogen-blended hydrogen gas from the compressors 106 in the LP section 70.

The multistage compression system 10 also has an MP section 72 comprising a plurality of centrifugal compressors 114 arranged in parallel and compressed nitrogen-blended hydrogen gas from the LP section 70 is distributed by third header 112 to the compressors 114. A fourth header 116 collects compressed nitrogen-blended hydrogen from the compressors 114 in the MP section 72 which then feeds the compressed nitrogen-blended hydrogen to the purification unit (not shown).

As indicated in the figure, the plurality 2 of electrolyser units 100 may include one or more further parallel groups 2c, etc. (not shown) of electrolyser units 100, each further group producing additional nitrogen-blended hydrogen gas which has been dosed with nitrogen from a nitrogen gas stream 204c, etc. (not shown) for collection by a further first header 102c, etc. (not shown) which would in turn be collected by an extension (not shown) of the second header 104.

In such embodiments, the LP section 70 of the multistage compression system 10 would include further compressors (not shown) arranged in parallel and nitrogen-blended hydrogen gas would be distributed to the feeds to the further compressors by the extension to the second header 104. In addition, compressed nitrogen-blended hydrogen gas would be collected from the further compressors by an extension (not shown) of the third header 112.

The MP section 72 of the multistage compression system 10 would also include further compressors (not shown) arranged in parallel.

During periods when demand for hydrogen exceeds production, nitrogen-blended hydrogen gas from storage 44 may be fed in stream 94, after suitable pressure reduction (valve 92), to the third header 112 for distribution to the compressors 114. Alternatively or subsequently, nitrogen-blended hydrogen gas from storage 44 may be fed in stream 98, after suitable pressure reduction (valve 96), to the second header 104 for distribution to the compressors 106.

It is also possible that nitrogen-blended hydrogen gas from storage 44 may be fed in stream 50, after suitable pressure reduction (valve 48) to the fourth header 116.

Figure 6:
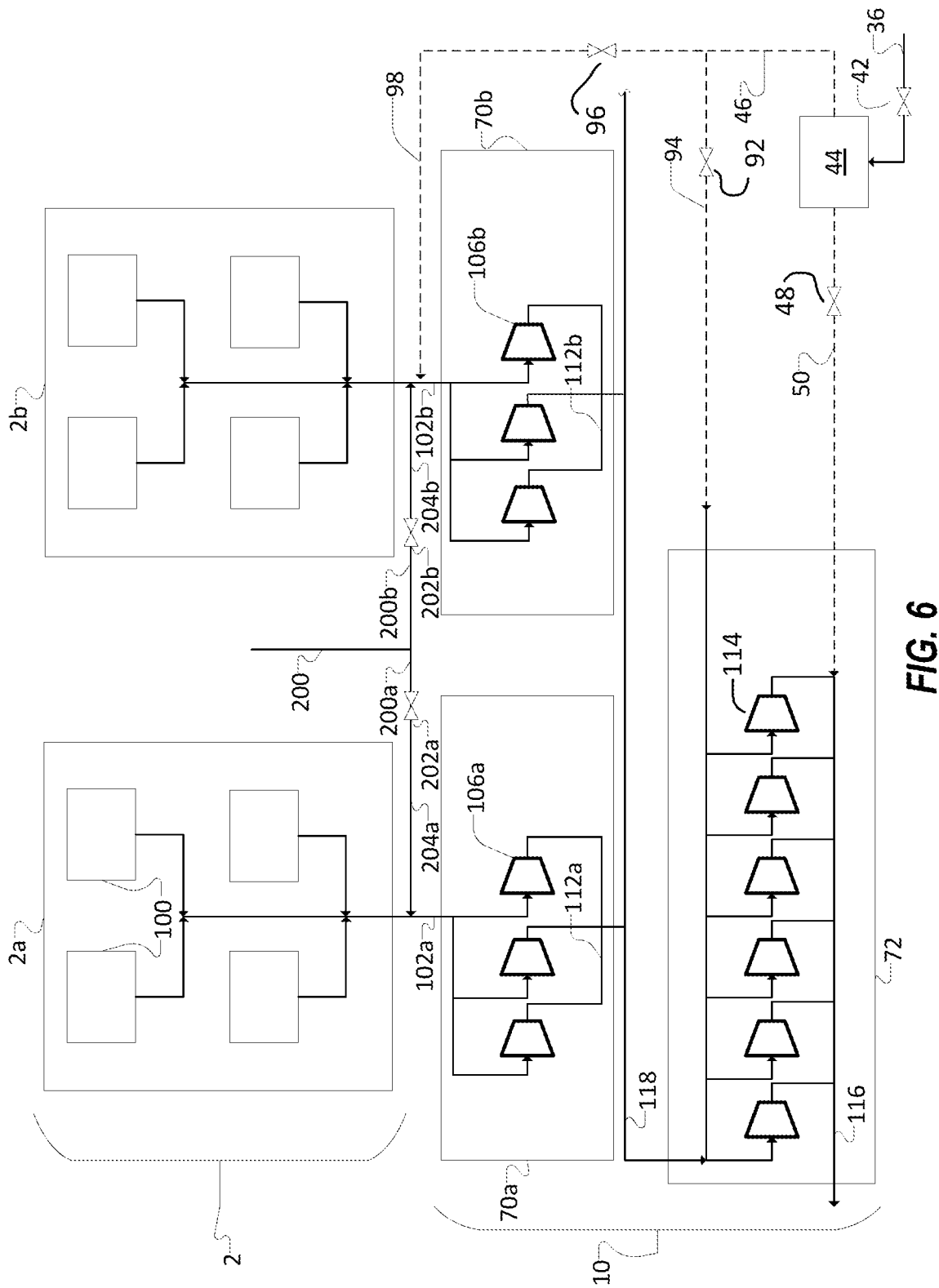
FIG. 6 is another simplified flowsheet providing further details of another option for integrating the second embodiment of the invention with the process of FIG. 1.

FIG. 6 illustrates another arrangement of the electrolysers and the multistage compression system depicted in FIG. 3. The same numerical references have been used to denote features of the arrangement in FIG. 6 that are common to the previous figures. The following is a discussion of the distinguishing features of this arrangement.

In this arrangement, the first section of the multistage compression system is divided into at least two parallel subsections, 70a and 70b; the first subsection 70a containing a first plurality of centrifugal compressors 106a arranged in parallel, and the second subsection 70b containing a second plurality of centrifugal compressors 106b arranged in parallel.

Hydrogen gas produced in each unit 100 within the first group 2a is collected by a first header 102a and hydrogen gas produced each unit 100 within the second group 2b is collected by another first header 102b.

A nitrogen gas stream 200 is produced by cryogenic distillation in an air separation unit (ASU; not shown) at a pressure at which the nitrogen gas is taken from the ASU, e.g. about 10 bar. Stream 200 is then split into two streams 200a and 200b.

Stream 200a is reduced in pressure across valve 202a to a pressure just over atmospheric pressure (e.g. about 1.1 bar) to provide stream 204a of nitrogen gas. The stream 204a of nitrogen gas is fed to the first header 102a to provide a nitrogen-blended hydrogen gas stream within header 102a which has been dosed with nitrogen gas.

Similarly, stream 200b is reduced in pressure across valve 202b to a pressure just over atmospheric pressure (e.g. about 1.1 bar) to provide stream 204b of nitrogen gas. The stream 204b of nitrogen gas is fed to the first header 102b to provide a nitrogen-blended hydrogen gas stream within header 102b which has been dosed with nitrogen gas.

Nitrogen-blended hydrogen gas is collected in the first header 102a which also distributes the gas to the compressors 106a in the first subsection 70a of the multistage compression system 10. Similarly, nitrogen-blended hydrogen gas is collected in a first header 102b which also distributes the gas to the compressors 106b in the second subsection 70b of the multistage compression system 10.

Compressed nitrogen-blended hydrogen gas produced by the compressors 106a in the first subsection 70a is collected by a second header 112a, and compressed nitrogen-blended hydrogen gas produced by the compressors 106b in the second subsection 70b is collected by a second header 112b.

A third header 118 collects compressed nitrogen-blended hydrogen gas from the second headers 112a and 112b and then feeds the gas to the centrifugal compressors 114 in the second section 72 of the multistage compression system 10.

As indicated in the figure, the plurality 2 of electrolyser units 100 may include one or more further parallel groups 2c, etc. (not shown) of electrolyser units 100, each further group producing additional nitrogen-blended hydrogen gas dosed with nitrogen gas by a nitrogen gas feed 204c, etc. (not shown) to provide nitrogen-blended hydrogen gas for collection by a further first header 102c, etc. (not shown).

In such embodiments, the LP section 70 of the multistage compression system 10 would include further compressors (not shown) arranged in parallel in further parallel subsections 70c, etc. and nitrogen-blended hydrogen gas would be distributed to the feeds to the further compressors by the further first headers 102c, etc. In addition, compressed nitrogen-blended hydrogen gas would be collected from the further compressors by an extension (not shown) of the third header 118.

The MP section 72 of the multistage compression system 10 would also include further compressors (not shown) arranged in parallel.

During periods when demand for hydrogen exceeds production, nitrogen-blended hydrogen gas from storage 44 may be fed in stream 94, after suitable pressure reduction (valve 92), to the third header 118 for distribution to the compressors 114 in the second section 72 of the multistage compression system 10.

Alternatively or subsequently, nitrogen-blended hydrogen gas from storage 44 may be fed in stream 98, after suitable pressure reduction (valve 96), to one or more first headers 102a, 102b for distribution to the compressors 106a, 106b in the second subsection 70b of the multistage compression system 10. Stream 98 is fed to the one or more first headers 102a, 102b downstream of the point at which the one or more nitrogen gas streams 204a, 204b, are fed to the one or more first headers 102a, 102b.

For simplicity, FIG. 6 illustrates feeding first header 102b only. However, it will be understood that stream 98 could feed into header 102a.

Nitrogen-blended hydrogen gas from storage 44 may be fed in stream 50, after suitable pressure reduction (valve 48), to the fourth header 116.

While the invention has been described with reference to the preferred embodiments depicted in the figures, it will be appreciated that various modifications are possible within the spirit or scope of the invention as defined in the following claims.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

All prior teachings above are hereby incorporated herein by reference. No acknowledgement of any prior published document herein should be taken to be an admission or representation that the teaching thereof was common general knowledge in Australia or elsewhere at the date thereof.

The invention claimed is:

1. A method for supplying hydrogen gas for consumption in at least one downstream process, the method comprising:
   electrolysing water to provide hydrogen gas;
   compressing the hydrogen gas in a multistage compression system to provide compressed hydrogen gas; and
   feeding at least a portion of the compressed hydrogen gas to the downstream process(es);
   wherein the multistage compression system comprises at least one centrifugal compression stage;
   wherein the hydrogen gas is dosed with nitrogen gas upstream of the centrifugal compression stage(s);
   wherein after dosing, the resultant nitrogen-blended hydrogen gas has an apparent molecular weight in a range from about 2.05 to about 7;
   wherein the nitrogen gas is present in the compressed hydrogen gas when fed to the downstream process(es); and
   wherein the downstream process(es) consumes nitrogen.

2. The method according to claim 1, wherein the hydrogen gas is dosed with the nitrogen gas upstream of an initial stage of the multistage compression system.

3. The method according to claim 1, wherein the hydrogen gas is dosed with the nitrogen gas downstream of an initial stage of the multistage compression system and upstream of an intermediate stage of the multistage compression system.

4. The method according to claim 1, wherein the centrifugal compression stage has a feed end and the hydrogen gas is dosed with the nitrogen gas at the feed end of the centrifugal compression stage.

5. The method according to claim 1, wherein further nitrogen gas is added as required to the compressed hydrogen gas upstream of the downstream process(es).

6. The method according to claim 1, wherein the multistage compression system comprises a first section and at least one further section downstream of the first section.

7. The method according to claim 6, wherein the hydrogen gas is dosed with the nitrogen gas upstream of an initial stage of the first section of the multistage compression system.

8. The method according to claim 6, wherein the hydrogen gas is dosed with the nitrogen gas downstream of the first section and upstream of an initial stage of the at least one further section of the multistage compression system.

9. The method according to claim 1, wherein during periods when more hydrogen gas is produced by the electrolysis than is required for the downstream process(es), the method comprises feeding excess compressed hydrogen gas to storage, optionally after further compression;

wherein during periods when more hydrogen gas is required for the downstream process(es) than is produced by the electrolysis, the method comprises withdrawing compressed hydrogen gas from storage and, after suitable pressure reduction, feeding the reduced pressure hydrogen gas to a stage of the multistage compression system, and wherein the compressed hydrogen gas is stored containing the nitrogen gas.

10. The method according to claim 9, wherein the hydrogen gas is dosed with the nitrogen gas upstream of the stage of the multistage compression system to which the reduced pressure hydrogen gas is fed during periods when more hydrogen gas is required than is produced by the electrolysis.

11. The method according to claim 1, wherein the amount of hydrogen gas being provided by the electrolysis of water is variable, and the hydrogen gas is dosed with the nitrogen gas in an amount determined based upon the amount of hydrogen gas being provided by the electrolysis.

* * * * *